United States Patent [19]

Henderson et al.

[11] Patent Number: 4,669,042

[45] Date of Patent: May 26, 1987

[54] STEPLESS PULSE COUNT SWITCHING

[75] Inventors: Alan R. Henderson; John P. Sheppard, both of Carlsbad, Calif.

[73] Assignee: The United States of America as represented by the Secretary of the Air Force, Washington, D.C.

[21] Appl. No.: 753,504

[22] Filed: Jul. 10, 1985

[51] Int. Cl.[4] .............................................. G05B 7/00
[52] U.S. Cl. .................................. 364/181; 364/167;
377/55; 318/591; 318/594; 318/603
[58] Field of Search ............... 364/181, 167; 318/591,
318/594, 603; 377/55, 111, 13

[56] References Cited

U.S. PATENT DOCUMENTS

| | | | |
|---|---|---|---|
| 3,488,478 | 1/1970 | Gilbert | 235/150.5 |
| 3,772,602 | 11/1973 | Kobayashi | 318/591 |
| 3,882,368 | 5/1975 | Carleton | 318/591 |
| 3,916,327 | 10/1975 | Lampen et al. | 328/147 |
| 3,940,593 | 2/1976 | Bleak et al. | 364/181 |
| 3,940,594 | 2/1976 | Bleak et al. | 364/181 |
| 3,990,014 | 11/1976 | Hakozaki | 328/42 |
| 4,025,762 | 5/1977 | Rossi et al. | 364/178 |
| 4,061,901 | 12/1977 | Saunders et al. | 377/55 |
| 4,065,720 | 12/1977 | Pogue, Jr. | 377/55 |
| 4,141,065 | 2/1979 | Sumi et al. | 364/181 |
| 4,227,072 | 10/1980 | Fancy et al. | 377/2 |
| 4,241,418 | 12/1980 | Stanley | 364/900 |
| 4,350,941 | 9/1982 | McClure et al. | 318/603 |
| 4,353,020 | 10/1982 | Veale | 318/603 |
| 4,394,609 | 7/1983 | Janicki et al. | 318/603 |
| 4,447,798 | 5/1984 | Shapino | 377/55 |
| 4,469,994 | 9/1984 | Lundberg et al. | 364/181 |
| 4,509,000 | 4/1985 | Ferguson | 364/181 |

Primary Examiner—Michael R. Fleming
Assistant Examiner—John R. Lastova
Attorney, Agent, or Firm—Bernard E. Franz; Donald J. Singer

[57] ABSTRACT

An up-down counter is fed pulses generated manually and/or automatically from either or any of two or more command sources. Gating circuitry ahead of the up-down counter may be used to enable counts from only one source at a time. The output of the counter represents the magnitude of the parameter to be controlled. The purpose is to transfer control of a parameter to any of several command sources without changing the value of the parameter, thereby achieving "stepless" switching. Only one counter is needed regardless of the number of command sources, no synchronizing circuitry is required, and switching is provided with no steps or delays. Multiple command sources may be active simultaneously when command source input gating is not used ahead of the up-down parameter magnitude counter.

9 Claims, 14 Drawing Figures

STEPLESS PULSE COUNT SWITCHING

RIGHTS OF THE GOVERNMENT

The invention described herein may be manufactured and used by or for the Government of the United States for all governmental purposes without the payment of any royalty.

BACKGROUND OF THE INVENTION

This invention relates to a system in which pulse sources to a counter are switched without changing the value in the counter; and more particularly to a system in which the output of one or more counters determines some parameter used for control of a function such as movement of a motor shaft or the amount of power supplied to a device. The pulse sources may be one with manual control and one with microprocessor control, with feedback.

Systems for numerical controlled machining of parts have been controlled by digital pulse systems which include up-down counters and various types of processors. The present invention relates to a system for control of motors and R.F. power for automatic zoning of high-grade silicon. The ability to automate requires (a) accurate and precise measurements of speed and position, (b) the ability to easily and accurately process this data and compare to a preset program for crystal growth, and (c) the ability to go from manual to automatic control without disturbing the crystal growth process. Analysis of these requirements showed that digital signal processing was superior to analog. A bonus feature of digital processing is to allow for future flexibility of the system with reasonable costs.

United States patents of interest include U.S. Pat. No. 3,488,478 to Gilbert which discloses apparatus in which computer signals are fed to a comparator, the output signal from the comparator being fed to a NOR gate to which a clock pulse source is also connected. The outputs of gates and of a flip-flop outputs are routed to a logic patchboard and then to a digital computer.

U.S. Pat. No. 3,916,327 to Lampen et al discloses a circuit in which a digital clock or ascillator has an output connected to one input of a gate. Output of a voltage comparator is connected to one of the inputs of each of a pair of gates. The outputs of the latter gates are applied to an up-cown counter. Outputs of the up-down counter are connected to a D/A converter. The output of the D/A converter is connected to inputs of voltage comparators and also provides an output for the device. Diodes provide a display from the counter.

U.S. Pat. No. 3,990,327 to Hakozaki discloses circuitry wherein an up-down counter is controlled by a gate which is enabled by closure of a manual switch and a variable pulse generator. The up-down counte is also controlled by a gate which is enabled by a computer.

U.S. Pat. No. 4,241,418 to Stanley shows use of a microprocessor to produce signals to select clock cycle periods.

U.S. Pat. No. 4,496,936 to Kramer shows digital shaft encoders and digital-analog conversion for the shaft encoders.

SUMMARY OF THE INVENTION

An object of this invention is to provide special digital control circuitry for automation compatibility, with bumpless switching of control between automation and manual modes and/or between different control stations.

The invention relates to a system which comprises an up-down counter which is fed pulses generated manually by incremental encoders or voltage controlled oscillators and/or automatically from either or any of two or more command sources. Gating circuitry ahead of the up-down counter may be used to enable counts from only one source at a time. The output of the counter represents the magnitude of the parameter to be controlled.

With this invention, for each controlled parameter the system needs only one counter regardless of the number of command sources, requires no synchronizing circuitry, and provides switching with no steps or delays. This invention also allows multiple command sources to be active simultaneously when command source input gating is not used ahead of the up-down parameter magnitude counter.

DETAILED DESCRIPTION

The purpose of this invention is to transfer control of a parameter to any of several command sources without changing the value of the parameter thereby achieving "stepless" switching. Previously, command sources had to be synchronized, i.e., brought to the same value, before switching. This has been done with analog or digital meters compared by a control system operator or by analog or digital magnitude comparitors providing a signal indicating command equality to the operator. Command switching has also been implemented by an operator switch movement which initiates pulse inputs to a counter or presets a counter to make its output equal to the counter magnitude which was formerly controlling the parameter. All of these concepts delayed switchover to the new command source or required counters and synchronizing circuitry for each command source. This invention needs only one counter regardless of the number of command sources, requires no synchronizing circuitry, and provides switching with no steps or delays. This invention also allows multiple command sources to be active simultaneously when command source input gating is not used ahead of the up-down parameter magnitude counter.

TYPICAL CIRCUIT FOR STEPLESS SWITCHING OF PULSE SOURCES

Figure 1:
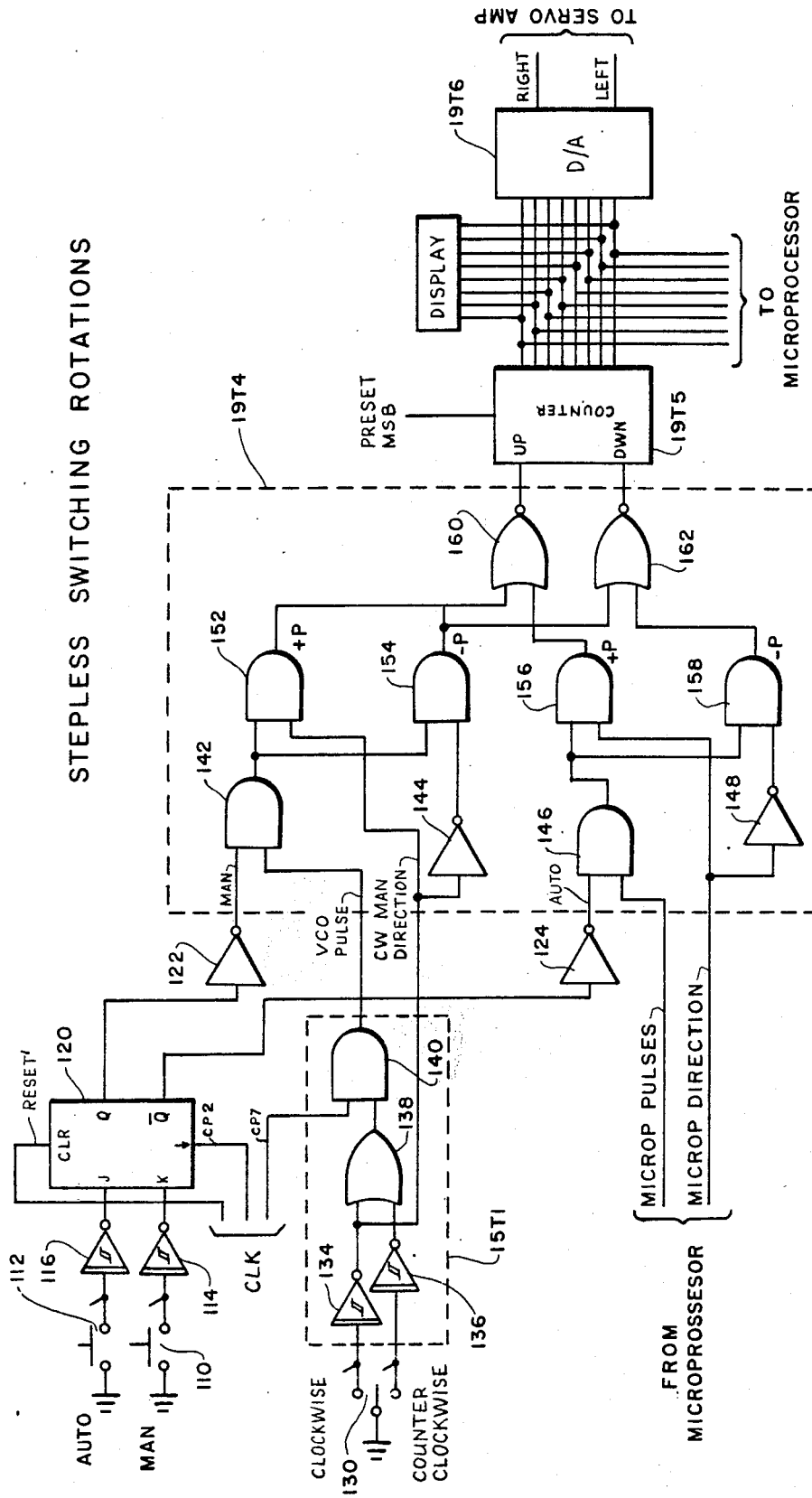
FIG. 1 is a functional block diagram a typical circuit according to the invention with an up-down counter and gates for controlling the selection from pulses for manual or automatic control.

FIG. 1 shows shows a set of logic gates in block 19T4 for controlling the supply of pulses to an up-down counter 19T5. As shown in FIG. 4B. the digital output of the up-down counter 19T5, via a digital-to-analog converter 19T6 and a servo amplifier 18B1, supplies signals to operate a rotation motor. The output of the counter is also supplied to a display for manual control, and to a microprocessor for automatic control.

Figure 4A:
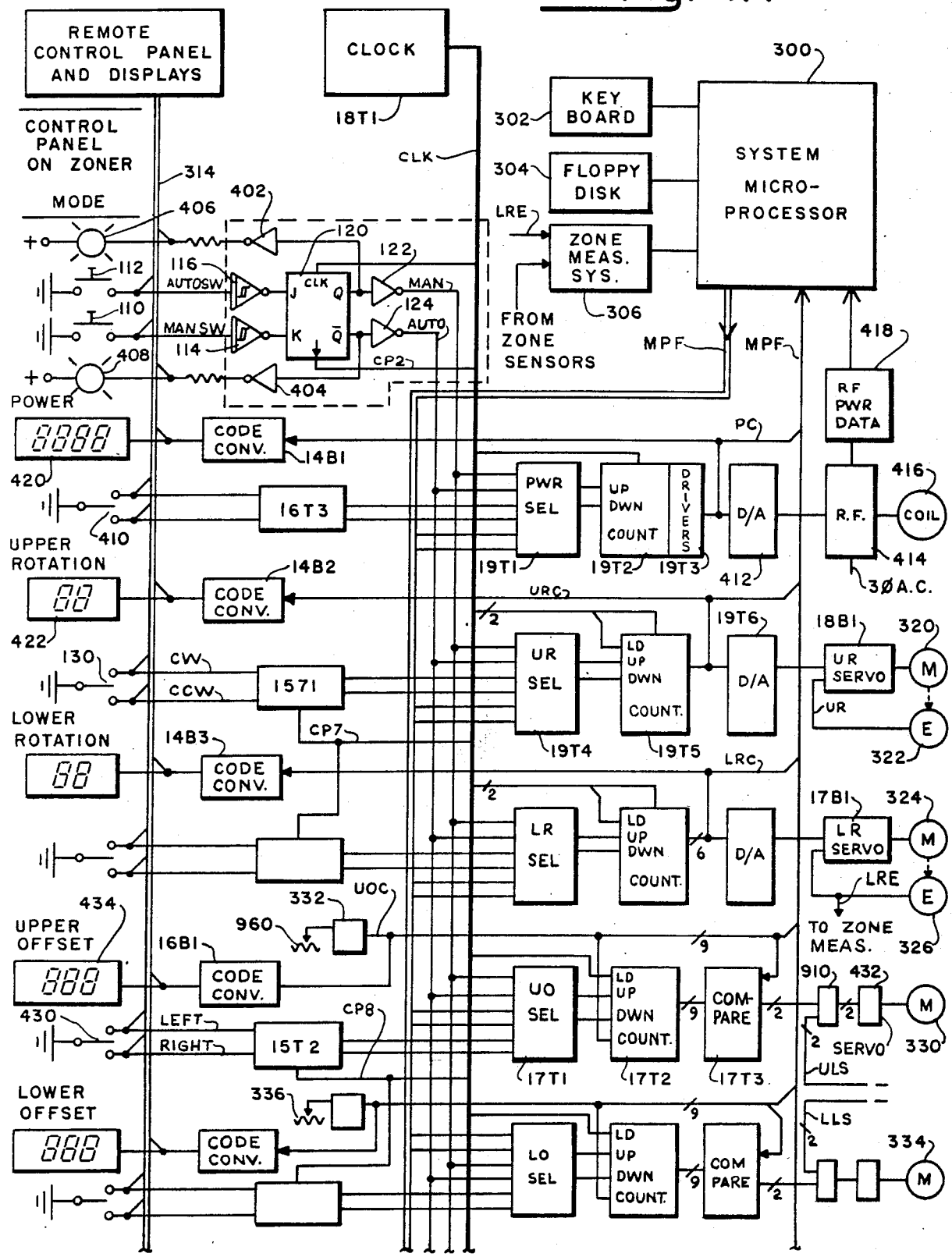
FIGS. 4A, 4B and 4C when arranged as shown in FIG. 4 comprise a more detailed block diagram of the system of FIG. 3.
Figure 4B:
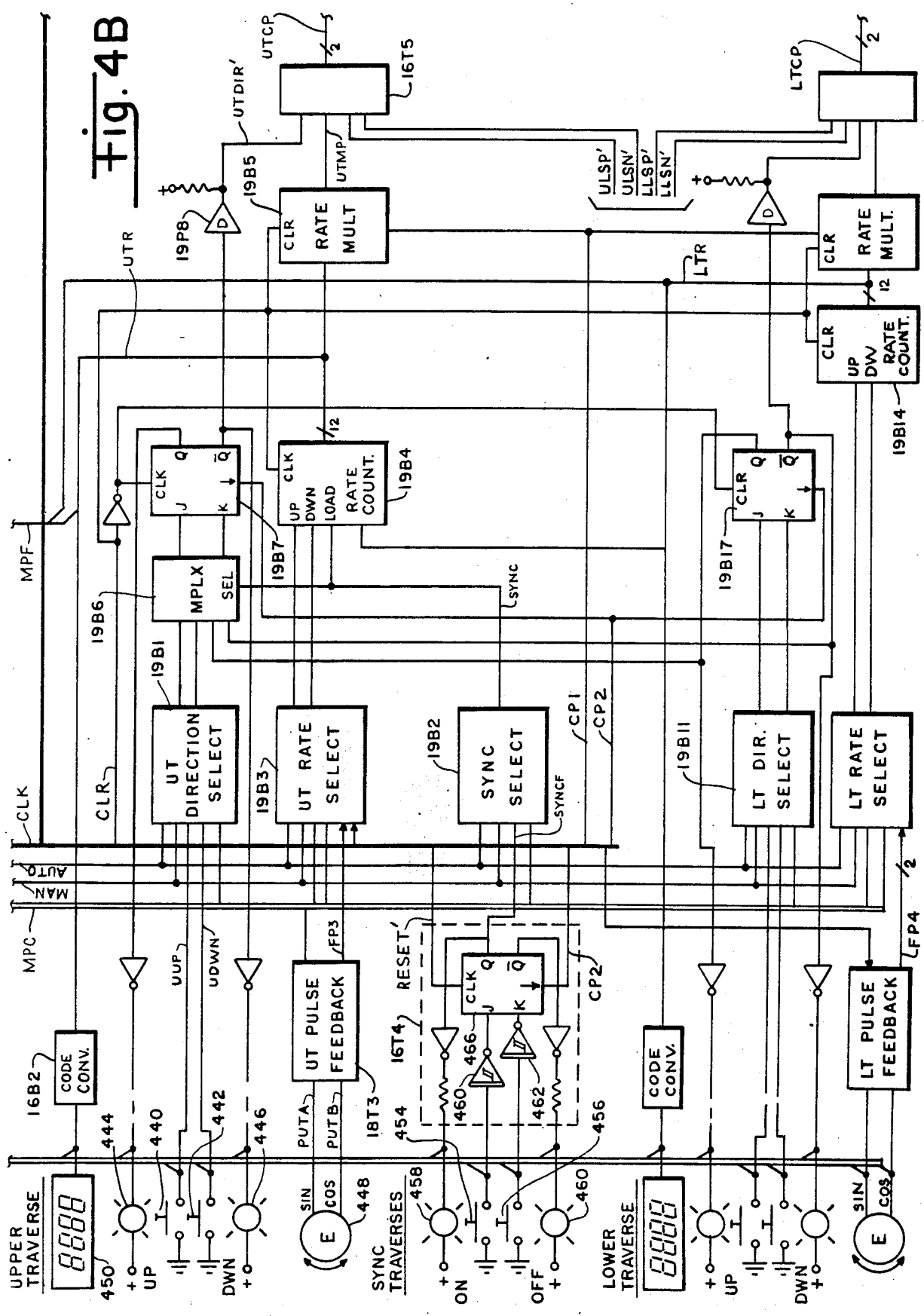

As shown in FIGS. 1 and 4A, the mode of operation is selected from the panel by a switch 110 for manual or a switch 112 for automatic. These are normally open, momentary close switches. A ground signal from switch 110 is inverted via a schmitt trigger 114 to supply a high signal to the K input of a flip-flop 120, and a clock pulse on lead CP2 puts the flip-flop in the reset state, making the Q ouput low, and via an inverter 122 placing a high signal on lead MAN. Similarly, a ground signal from switch 112 is inverted via a schmitt trigger 116 to supply a high signal to the J input of the flip-flop 120, and the clock pulse on lead CP2 puts the flip-flop in the set state, making the Q' ouput low, and via an inverter 124 placing a high signal on lead AUTO.

In the manual mode, pulses may be supplied by operation of a double-pole, spring return to a center off position, switch 130. The two positions of operation of the switch provide for clockwise and counterclockwise operation respectively of the upper rotation motor. Operation in either direction provides a ground signal which is inverted by a schmitt trigger 134 or 136. The resulting high signal is supplied via an OR gate 138 to an AND gate 140. Gate 140 is thereby enabled to couple clock pulses from lead CP7 to an AND gate 142. With the signal on lead MAN high, gate 142 is enabled to in turn couple the pulses to AND gates 152 and 154. The direction of operation is determined by the output of trigger 134, which when high enable gate 152, and when low, via an inverter 144, enables gate 154. If the switch 130 is in the clockwise position, the pulses from gate 152 via a NOR gate 160 are effective at the Up input of counter 19T5; and if the switch 130 is in the counterclockwise position, the pulses from gate 154 via a NOR gate 162 are effective at the DOWN input.

In the automatic mode, pulses are supplied from the microprocessor to an AND gate 146. With the signal on lead AUTO high, gate 146 is enabled to in turn couple the pulses to AND gates 156 and 158. The direction of operation is determined by a signal on a lead MICROP DIRECTION, which when high enables gate 156 and when low, via an inverter 148, enables gate 158. If the signal is high, the pulses from gate 156 via NOR gate 160 are effective at the Up input of counter 19T5; and if the signal is low, the pulses from gate 158 via NOR gate 162 are effective at the DOWN input.

The important feature is that the same up-down counter 19T5 is used for both manual and automatic operation and that operation of one of the mode switches 110 or 112 does not in itself cause any pulses to be generated which reach the counter and change the value registered therein.

Figure 2:
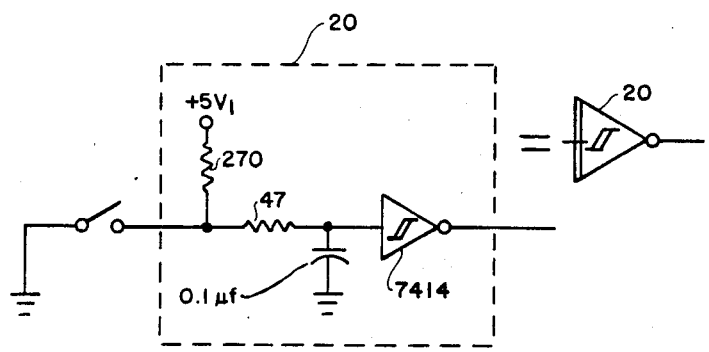
FIG. 2 is a diagram showing a symbol for a Schmitt trigger with input components for a signal from a manual switch.

For convenience, the schmitt triggers having inputs from switches are represented in the drawings herein by a symbol as shown in FIG. 2. The symbol has a double line at the input to represent the circuit shown in box 20. The inverter is a type 7414 integrated circuit device, with a series resistor from its input to the switch a pull-up resistor from the switch to plus five volts, and a capacitor from the inverter input to ground. This circuit eliminates any response to contact bounce.

ZONE REFINER

The invention has been incorporated in a prototype zone refiner for producing high-quality intrinsic silicon, decribed in a report AFWAL-TR-82-4057, titled "Automatic Zoning of Detector Grade Silicon", which is a part of the DTIC (Defense Technical Documentation Center) collection of documents with accession AD B074232. A Model 103 zoner from Westech Systems. Inc. in Phoenix, Ariz. was modified to make the silicon crystal to specification. The transport motor controls were designed and built at Hughes Aircraft Company's Industrial Products Division at Carlsbad, Calif. The transport motor controls were designed and built to provide reliable digital controls and allow for automation compatibility. Salient features of significance to the invention include precise tracking of upper and lower speeds for repass, highly stable speeds and power, special digital control circuitry for automation compatibility (bumpless switching of control between automation and manual modes and between different control stations), and digital encoders for position and speed sensing.

TRANSPORT SYSTEM

The silicon crystal is oriented in a vertical direction. The transport system provides a high degree of control for all movements involved in the growth of silicon crystals. Smooth and precise control of the upper and (feed) and lower (seed) shafts (rotation and translation) are needed to grow dislocation free crystals with a narrow range of resistivities. All control functions are digitized with enough resolution to provide smooth variation of parameter values. Great flexibility in machine operation (such as to vary zoning speeds or go to fast setup speeds) is made possible by the wide range covered by each manually controlled output. Each motor controlled axis incorporates a feedback sensor which measures actual rates and positions, rather that commanded values from the controller. These sensors not only provide very accurate data for manual control and display purposes but also provide information to the microprocessor for an automated closed loop system.

The upper and lower transports provide the rotation and translation to the silicon rods, as the molten zone is heated by the stationary r.f. coil. Precise seed orientation, rod alignment, and smooth and precise translation and rotation can be guaranteed by precisely made, sturdy mechanical transports. Water cooled shafts hold the poly silicon feed rod from the top and the seed and growing crystal from the bottom of the chamber. These are smoothly rotated (in the same or counter directions) at programmed speeds by servo-amplifier powered precision motors. The end of each shaft is mounted in the center of three plates which moves along a tripod rod support on precision bearings, being translated by a ball screw driven by a servo-driven motor. Each of these two total transport units can be offset from the r.f. coil axis (up to ±4 mm) by a motor drive to provide for (a)

better coupling of seeds to the r.f. coil for larger diameter crystals and (b) smoothing of radial resistivity gradients by offsetting the axes of the seed rod and growing crystal.

Motors have been selected (PMI Model U12M4/OT) which are characterized by low vibration as well as reliability and long life. A motor drive (using Bodine motors with position potentiometers and A/D converter output) is used to drive the entire upper or lower transport assembly with respect to the chamber. The transport assembly rotates about a back support rod on bearings.

TRANSPORT CONTROL DESIGN

Requirements for high reliability and for the ability to automate led to a new design for the motor drives and controls for the upper (feed rod) and lower (seed) shafts of the zoner. The ability to automate requires (a) accurate and precise measurements of speed and position. (b) the ability to easily and accurately process this data and compare to a preset program for crystal growth, and (c) the ability to go from manual to automatic control without distrubing the crystal growth process. Analysis of these requirements showed that digital signal processing was superior to analog. A bonus feature of digital processing is to allow for future flexibility of the system with reasonable costs.

The transport control design utilizes digital circuitry to assure accuracy and repeatability. This philosophy pervades critical functional areas such as the upper and lower traverse circuitry and manual input controls. Other (not so critical) circuitry combines the best features of digital and analog circuit design to minimize the number of components and enhance reliability. The number of adjustment potentiometers is also minimized. Shielded cables carrying digital control signals provide a high degree of immunity to electrial noise. Filters and clamp diodes are provided to suppress EMI generation by inductive loads, since it is necessary to work with small control signals close to a large r.f. power supply. Electronic equipment is packaged to allow easy access and efficient heat removal.

The transports may be fully controlled either automatically or manually with stepless switching between operational modes. This is accomplished by circuit hardware which receives digital inputs from manual controls and the automation microprocessor. These digital inputs control (for each parameter) the output of a counter which represents the commanded value of that parameter. When the control mode is switched from automatic to manual the counter output (parameter value) does not change, thereby providing "stepless" switching. When the control mode is switched from manual to automatic the same is true except that a microprocessor controlled transistion from the manually set value to the programmed value is performed. If stepless switching were not provided. the operator would need to precisely match all critical speeds and powers just before he takes control or before he gives it back to the automation circuitry, which is difficult when he is in the middle of a zoning problem. Rapid changes can lead to loss of crystal structure or even spilling the molten zone.

The traverse rates are manually controlled by incremental shaft encoders which provide a precision means for the operator to change traverse rates, rate of change, and to synchronize upper and lower traverse rates through observing the digitally derived traverse rate displays. The other magnitude controls incorporate spring return to a center off position so that no change pulses are generated unless the switch is manually operated.

Operator controls and displays allow a high degree of repeatability. All parameter magnitudes are determined by a binary number. The number of bits in each of these numbers is sufficient to provide fine control of all parameters.

Figures 4, 4C:
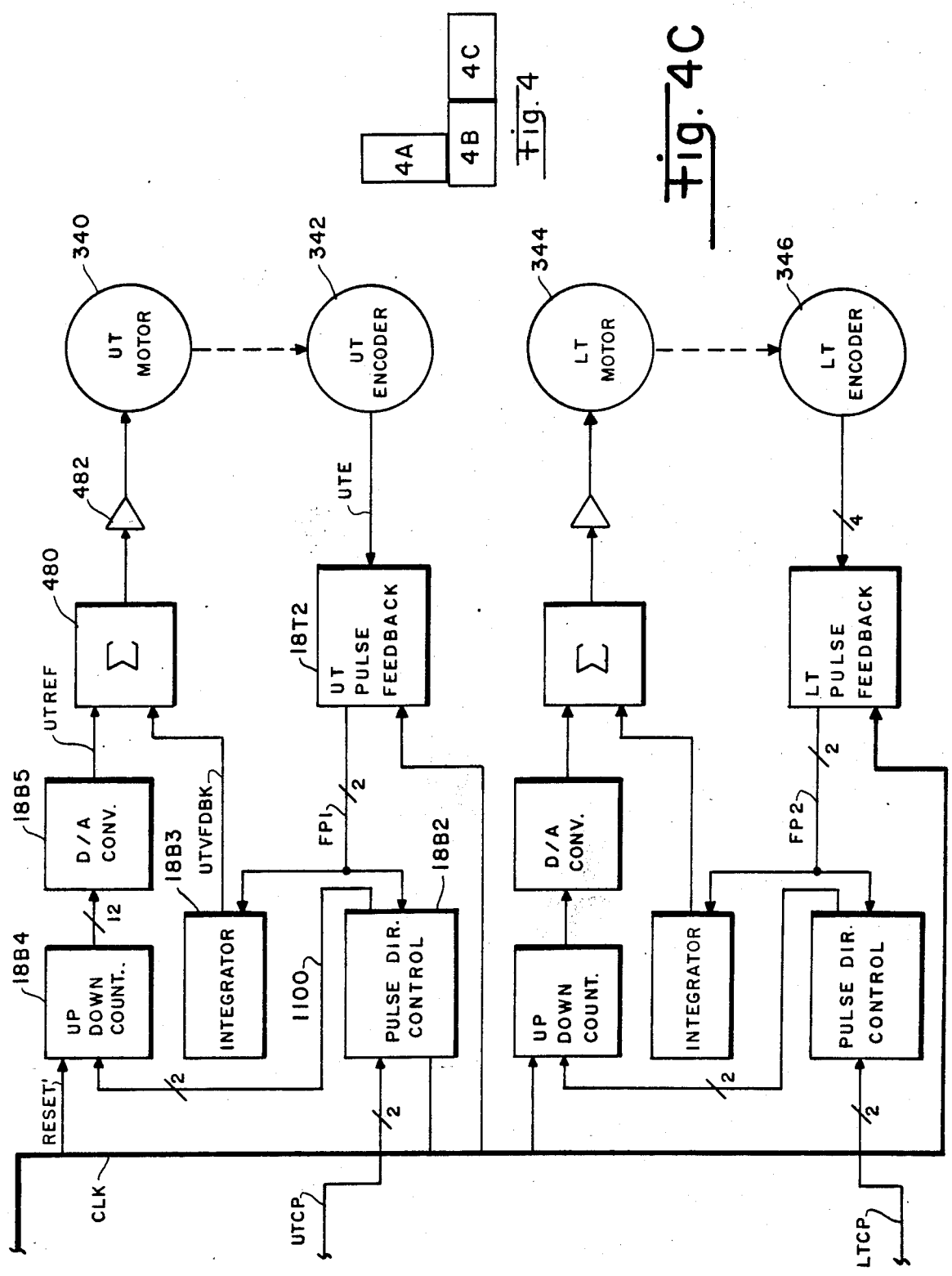

Wide speed range traverse servo-drives simplify zoner operation. These drives have long-term accuracy based upon a quartz crystal oscillator. They utilize encoder position feedback which is compared with a position command in an up-down counter to generate the signal which controls the servo amplifier. For constant velocities there is essentially no long-term difference between the commanded and actual traverse rates. Short-term rate errors are made inconsequential by a high gain velocity feedback loop around the motor and servo amplifier. FIG. 4C shows a block diagram of the traverse closed loop position and velocity control.

Figure 3:
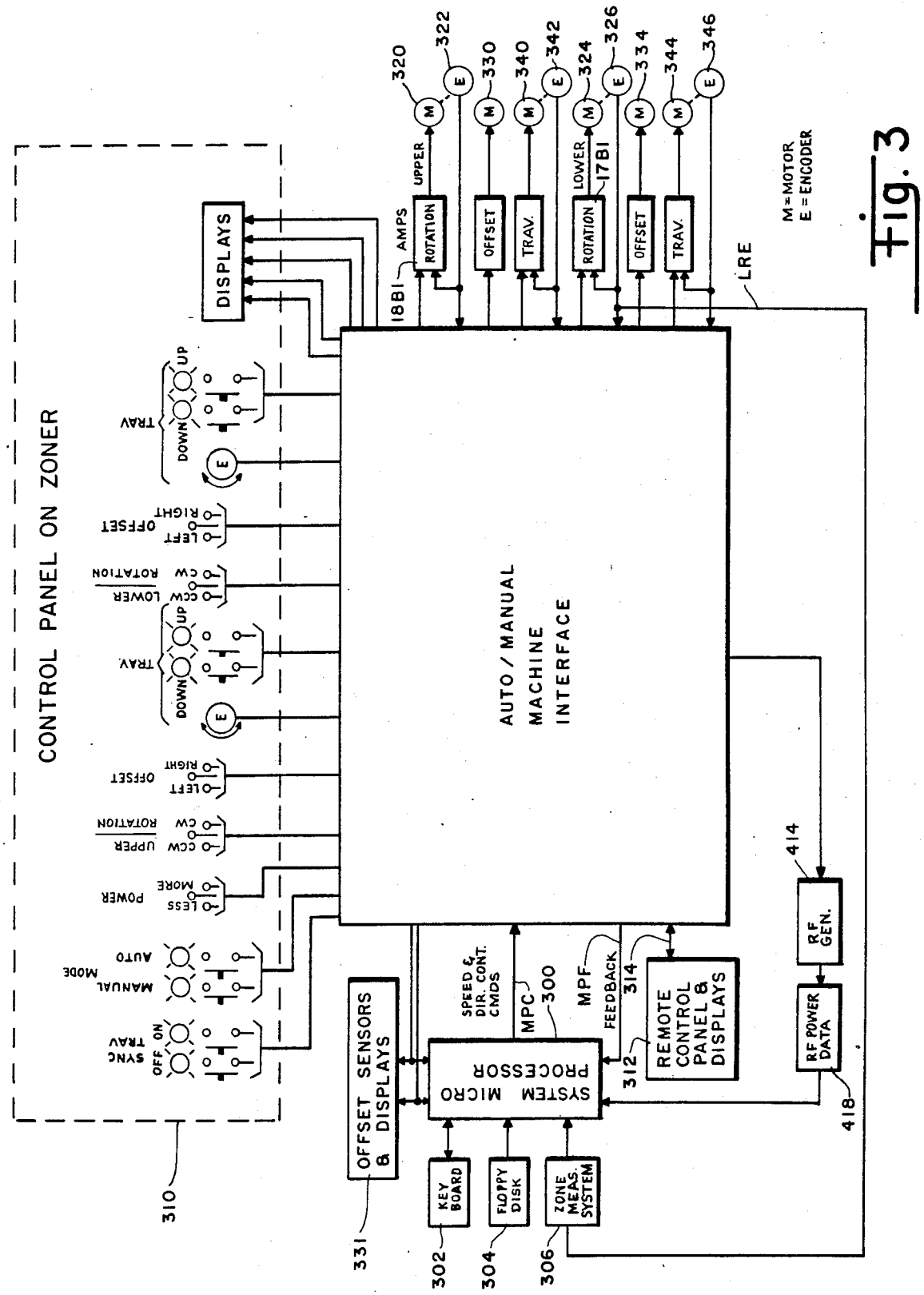
FIG. 3 is a system block diagram for control of a zoner system.

Machine mounted sensors have been selected to provide accurate feedback signals for displays and closed loop control circuits. Traverse and rotations rates are sensed by shaft position encoders. Digital signals for shaft offsets and r.f. power are also provided. The values of these seven parameters are visible on each control panel (one at the zoner and one for remote control of several zoners simultaneously) in the form of dedicated decimal displays. These displays allow the zoner operator to precisely and repeatably control transport movements. FIG. 3 is an electrical block diagram showing the displays, manual controls, and the controlled transport elements. FIGS. 4A, 4B and 4C arranged as shown in FIG. 4 comprise a more detailed block diagram.

The seven displays, shown with the manual controls along the left side of FIGS. 4A and 4B, show the magnitude and direction of transport speeds, offset positions and r.f. power and are decimal 7-segmenmt LED displays. The manual controls, also located across the top of FIG. 3 and the left of FIGS. 4A and 4B, are a set of switches and digital encoders. The controlled transport elements are the motors on the right side of FIG. 3 and the right side of FIGS. 4A and 4C.

The four translation and rotation motors were selected for their reliability, low vibration and wide range of speeds. Using one model for both rotation and translation leads to fewer spare parts and the ability to switch motors if one is giving problems. The performance and degree of control requires a servo-controlled motor. The PMI Model U12M4/OT was selected as the most reliable unit that would meet system requirements. It is a flat "printed circuit" motor, as compared to an iron-core armature type. It has a long brush life; however, the motor was especially built such that the brushes are easily accessible for maintenance. Its wide speed range allows both setup and zoning operations to be done with one drive, unlike all other zoner designs which use a separate setup motor with gears and clutches. These have been sources of vibration, wear and low reliability. This PMI motor has very low vibration due to its low inertia disk and very low cogging. Freedom from electric arcing also increases its reliability.

Each motor is controlled by a servo-amplifier. The design for this zoner is patterned after a highly reliable servo-drive (Hughes NC-2000) used in numerical controlled machining of aerospace parts. Hughes made the first all solid state numerical control unit (for a multi-axis machining center at Hughes for aircraft parts), and this particular type has been in use for many years with very few failures. D/A (digital to analog) conversion of the input signals to drive the amplifier is precise and reliable. The up-down counter for "stepless switching" simplifies the digital circuitry and makes it more reliable. Custom designed and assembled printed circuit boards are housed in the service module.

Encoders are attached to the motor shafts to give precise indication of the actual shaft location or speed coming from the motor, as opposed to looking at the motor control signal—what you are telling it to do. The mechanical output of the motors to the transport shafts is carefully designed to eliminate sloppiness in this drive train, thus the encoders give a precise indication of what is happening at the growing crystal. One thousand count digital encoders (made by PMI and mounted on the motor) give position indications at the crystal of 0.127 μm/digit ($5 \times 10^{-6}$ inches/digit). This is used for velocity feedback. The sensitivity is needed to provide a fast control time constant when the rods are moving very slowly, as they do during zoning. Precise encoders also allow for synchronous repass of the solid silicon rod through the r.f. coil when setting up for the next pass, without going to a troublesome mechanical locking method. The upper and lower rods are synchronized to within 1 digit, since the same command signal is used, which is within 25.4 μm (0.001 inch). The rest of the mechanical train has been measured to be within another 25.4 μm (0.001 inch) over a 2.54 cm (1-inch travel). A small amount of float ($<1$ mm) is provided by the seed chuck so as not to break the seed during repassing.

OVERALL SYSTEM

The control diagram for the automatic zoner can be represented as shown in FIGS. 3 and 4. These diagrams include only those basic elements of the total zoner system which relate to control of rf power and mechanical motion. A comprehensive diagram would include also the automatic vacuum/inert gas system which is a part of the completed prototype zoner. Reference characters on some blocks refer to printed circuit boards on which the circuits are principally located, these being boards 14T–19T and 14B–19B which are interconnected by backplane wiring and by cabling to units on the zoner. etc.

The system includes a control panel 310 on the zoner, and a remote control panel 312 which is essentially a duplication of the control panel on the zoner. The panels are shown connected by a cable 314 in FIGS. 4A and 4B, which connects each terminal of the control panel 310 to a corresponding terminal of the remote panel 312. The control panel 310 comprises the switches, lamps, and displays shown to the left of cable 314 in FIGS. 4A and 4B. Note that it makes no difference whether a switch is operated on the panel 310 or the corresponding switch operation is effected at the panel 312. The same lamps will be lighted and the same values shown at the displays of the two panels.

The system microprocessor 300 has inputs on a set of conductors MPF for feedback control, and outputs on a set of conductors MPC for command signals. The microprocessor is also coupled to a keyboard 302, to a floppy disk system 304, and to a zone measurement system 306.

DIAMETER SENSOR SYSTEM

Total automation of the zoning process requires accurate sensing of the diameter of the growing crystal. Automatic control of the process implies more than diameter control, per se, and useful information is provided by other dimensions of the molten zone. To obtain the required dimensional data it is necessary to image or scan the molten zone with some kind of sensor or detector from outside the chamber. A detector for infrared radiation can be utilized for imaging the molten zone, with scanning of the infrared image by galvanometer-driven mirrors. The sensor system of the zone measurement system 306 should have its own microprocessor, which communicates with the main microprocessor 300.

MICROPROCESSOR CONTROL

The zoner microprocessor 300 processes information from the operator control panel. The controller can make adjustments by issuing pulses to the desired parameters. The diameter sensor controller of system 306 controls the scanning mirror subsystem and receives rotational information from the upper and lower rod.

The following signals are input to the zone controller:
RF power—10 bits
Upper traverse rate—12 bits
Lower traverse rate—12 bits
Upper rotation rate—6 bits
Lower rotation rate—6 bits
Upper offset—8 bits
Lower offset—8 bits
Auto/Manual Mode—1 bit
Upper platform upper limit switch—1 bit
Upper platform lower limit switch—1 bit
Lower platform upper limit switch—1 bit
Lower platform lower limit switch—1 bit
Vacuum Controller—1 bit.

The following signals are output from the zone controller:
RF power change direction—1 bit
RF power counter pulse—1 bit
Upper traverse rate direction—1 bit
Upper traverse counter pulse—1 bit
Lower traverse rate direction—1 bit
Lower traverse counter pulse—1 bit
Upper offset direction—1 bit
Upper offset counter pulse—1 bit
Lower offset direction bit—1 bit
Lower offset counter pulse—1 bit
Vacuum/Gas Controller—1 bit.

The following information is passed between the zone controller and the diameter sensor controller:
Upper diameter
Waist diameter
Bulge diameter
Lower diameter
Upper zone height
Lower zone height
Start/reset
Stop.

The automatic vacuum/gas sequencer will also communicate with the zoner controller. The sequencer will accept commands from the controller (e.g. to switch from vacuum to argon for the final pass) and provide signals to the controller confirming the required vacuum or gas pressure.

DIAMETER SENSOR CONTROLLER SIGNALS

The following signals are input to the diameter sensor controller:

X mirror position—voltage
Y mirror position—voltage
Infrared sensor —voltage
Upper rod angular position—1 bit (pulsed)
Lower rod angular position—1 bit (pulsed)

The following signals are output from the diameter sensor controller:

X position mirror control—voltage
Y position mirror control—voltage

MANUAL/AUTOMATIC SWITCHING

The manual and automatic switches 110 and 112 shown in FIGS. 1, 3 and 4A pass control of the zoning process from the operator to the microprocessor, or return control to the operator. It is in this transfer of control that the "stepless switching" is important. The various figures of the drawing are diagrams which explain how the exisiting adjustments of power, speeds, rotation rates, and offsets, respectively, are maintained during the transition in either direction. The act of switching does not change the counts in the up/down counters which represent the levels of the respective parameters. After switching, the counts may be increased or decreased by pulses initiated by the microprocessor or the operator, as the case may be.

The prototype manual zoner incorporates and employs the manual portions of these circuits. Aside from their stepless switching capability, these digital circuits provide distinct advantages for manual operation, when compared with the analog circuits they supercede. The troublesome potentimeter on the control panel of the analog system is replaced by a rotary encoder in the digital system. Speed adjustments by the operator are stable and repeatable. Synchronization of the upper and lower transport motions is precise within a single digit, protecting the crystal as it is returned between passes supported on the fragile seed. Digital displays provide accurate speed and power information.

CLOCK, LOAD AND RESET

Figure 5A:
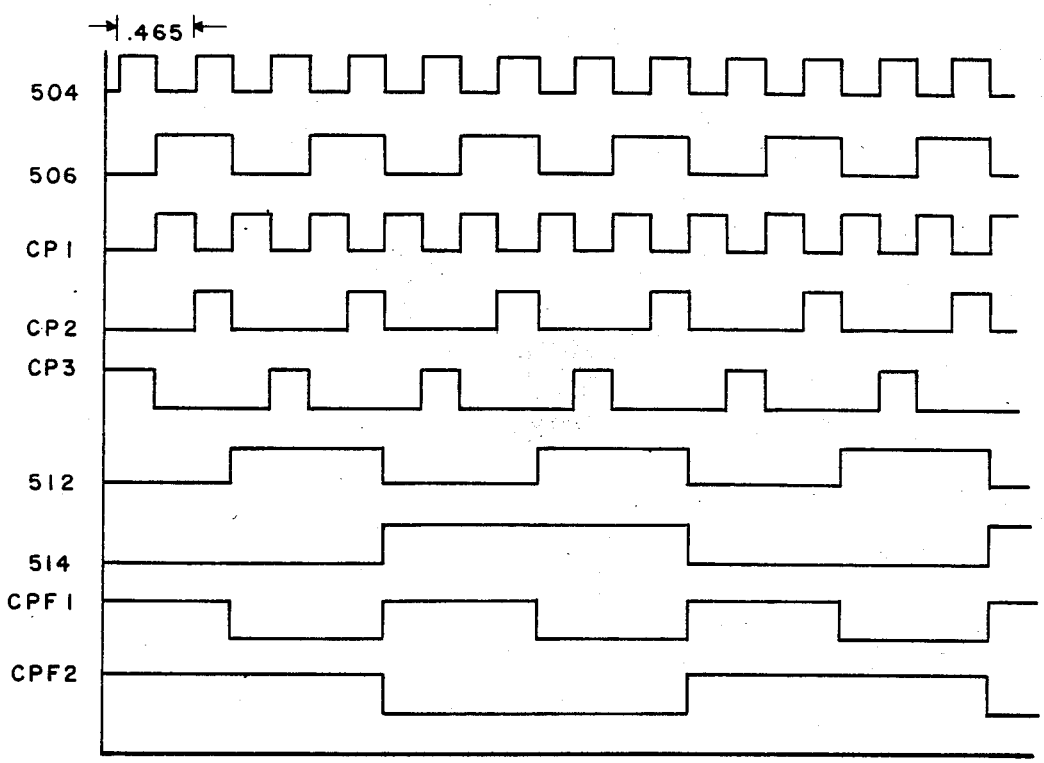
FIG. 5 is a functional block diagram showing generation of clock signals and other control signals.
Figure 5:
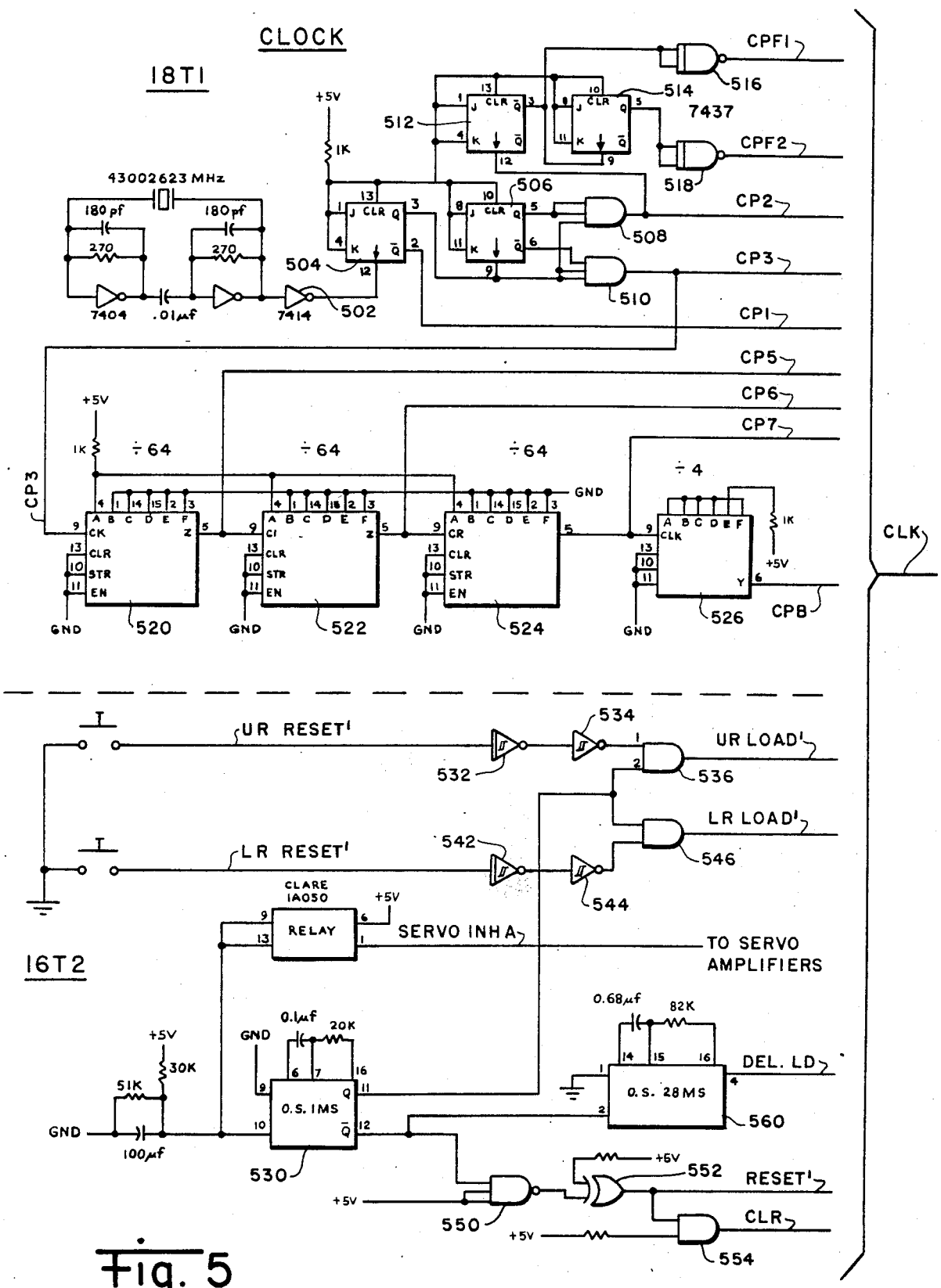

FIG. 5 is a functional block and schematic diagram of the clock, load and reset signal sources shown in FIG. 4A as a block 18T1. In FIG. 5 these circuits are divided into the clock pulse sources 18T1 and other signal sources 16T2. FIG. 5A is a timing diagram for part of the clock circuits.

The clock source is a crystal oscillator with two logic inverters, resistors, capacitors, having its output via a schmitt trigger 502. It generates a square wave having a pulse cycle of 0.325 microseconds. The clock uses type 74107 J-K master-slave flip-flops, which with the J, K and clear inputs all high, toggle when the clock input is high, and transfer the data to the output on the falling edge of the clock input. Flip-flop 504 has its clock input from the trigger 502 and has a square wave output with a pulse cycle of 0.465 microseconds. Flip-flop 506 has its clock input from the Q output of flip-flop 504 and has a square wave output with a pulse cycle of 0.93 microseconds. An output on lead CP1 is from the Q' output of flip-flop 504. Outputs on leads CP2 and CP3 are from the Q and Q' outputs of flip-flop 506 respectively via AND gates 508 and 510. The AND gates each have another input from the Q outout of flip-flop 504, so that each of the pulses on leads CP2 and CP3 are high for 0.2325 microseconds and low for the remainder of a 0.93-microsecond cycle, each being high in the middle of the low interval of the other. A flip-flop 512 is clocked from the lead CP2, and its output supplied via a type 7437 NAND buffer to lead CPF1 with a 1.86-microsecond pulse cycle. A flip-flop 514 is clocked from the Q output of flip-flop 512, and its output supplied via a type 7437 NAND buffer to lead CPF2 with a 3.72-microsecond pulse cycle.

Type 7497 rate multipliers 520, 522, 524 and 526 are used for generating other clock outputs. With the A input high and the BCDEF inputs low, these devices supply one output pulse for each 64 input pulses. Device 520 has its clock input from lead CP3 and its Z output to lead CP5 for suppling a pulse every 59.52 microseconds. Device 522 has its clock input from lead CP5 and its Z output to lead CP6 for suppling a pulse every 3.8 milliseconds. Device 524 has its clock input from lead CP6 and its Y output to lead CP7 for suppling a pulse every 243 milliseconds. Device 526 has its clock input from lead CP7 and its Y output to lead CP8, but it has its E input high and ABCDF low to divide by 4 and supplies a pulse on the average every 975 milliseconds.

A type 74221 device 530 has external resistors and capacitor to generate a delayed one-millisecond pulse when power is turned on. Its Q output is connected to inputs of two AND gates 536 and 546. An input from a manual switch via a trigger circuit 532 (as shown in FIG. 2) and another schmitt trigger 534 to a second input of gate 536, whose output is on lead URLOAD'. In like manner gate 546 supplies an output on lead LRLOAD'. These signals are used by the rotation control circuits to load a zero rotatlon rate command manually during operation and automatically when power is turned on.

The Q' output of device 530 is coupled via NAND gate 550 and an EXCLUSIVE OR gate 552 (used as a buffer) to output lead RESET'. The output of gate 552 is also coupled via an AND gate 554 (used as a buffer) to lead CLR.

Another type 74221 device 560 is connected as a monostable with an input from the Q' terminal of device 530 and an output to a lead DEL LD to supply a 28-millisecond delayed load pulse to the upper and lower offset up-down counters.

The set of output leads from FIG. 5 is collectively designated CLK for convenience in the drawings (actually separate backplane conductors).

MODE SELECTION

The mode selection circuit 16T1 in FIG. 4A has already been described in the description for FIG. 1. It comprises the flip-flop 120, with input triggers from the manual switches 110 and 112 via devices 114 and 116, and ouputs via inverter 122 and 124 to leads MAN and AUTO. It also includes inverters 402 and 404 connected from the Q and Q' outputs of the flip-flop to energize one of the lamps (light emitting diodes) 406 or 408 to indicate which mode is in effect.

R.F. POWER

The output of an r.f. power unit is supplied via a coaxial feedthrough into the zoning chamber to a work coil 416, for heating the silicon rod to provide a molten zone. Growing crystals at lower percentages of available output power provides longer component life (less stressing). The supply 414 is built in two structures (1) a d.c. power unit and (2) the r.f. power unit. The d.c.

power unit converts 480-volt 3-power via a transformer and filter network to high voltage d.c. It includes a controlled diode to regulate the high voltage to a specific voltage corrected for input voltage and load caused voltage changes. This is controlled by an op-amp/SCR controller. This controlled diode circuit provides instantaneous response to voltage changes for fast control response for the zoning operator. The r.f. output unit is controlled by controlling the d.c. voltage at the d.c. power unit.

Two sensors are key to controlling and regulating the r.f. output power. (1) D.C. plate current, the current coming into the r.f. unit, is monitored by a meter, with a d.c. voltage output that goes to the automation controls; and (2) d.c. plate voltage, also displayed on a meter, with the d.c. voltage output which is digitized at TTL compatible counts and goes to both the d.c. power supply controller circuit and the automation controls. FIG. 4A shows a r.f. power data unit coupling the r.f. power supply to the microprocessor 300.

Figure 6:
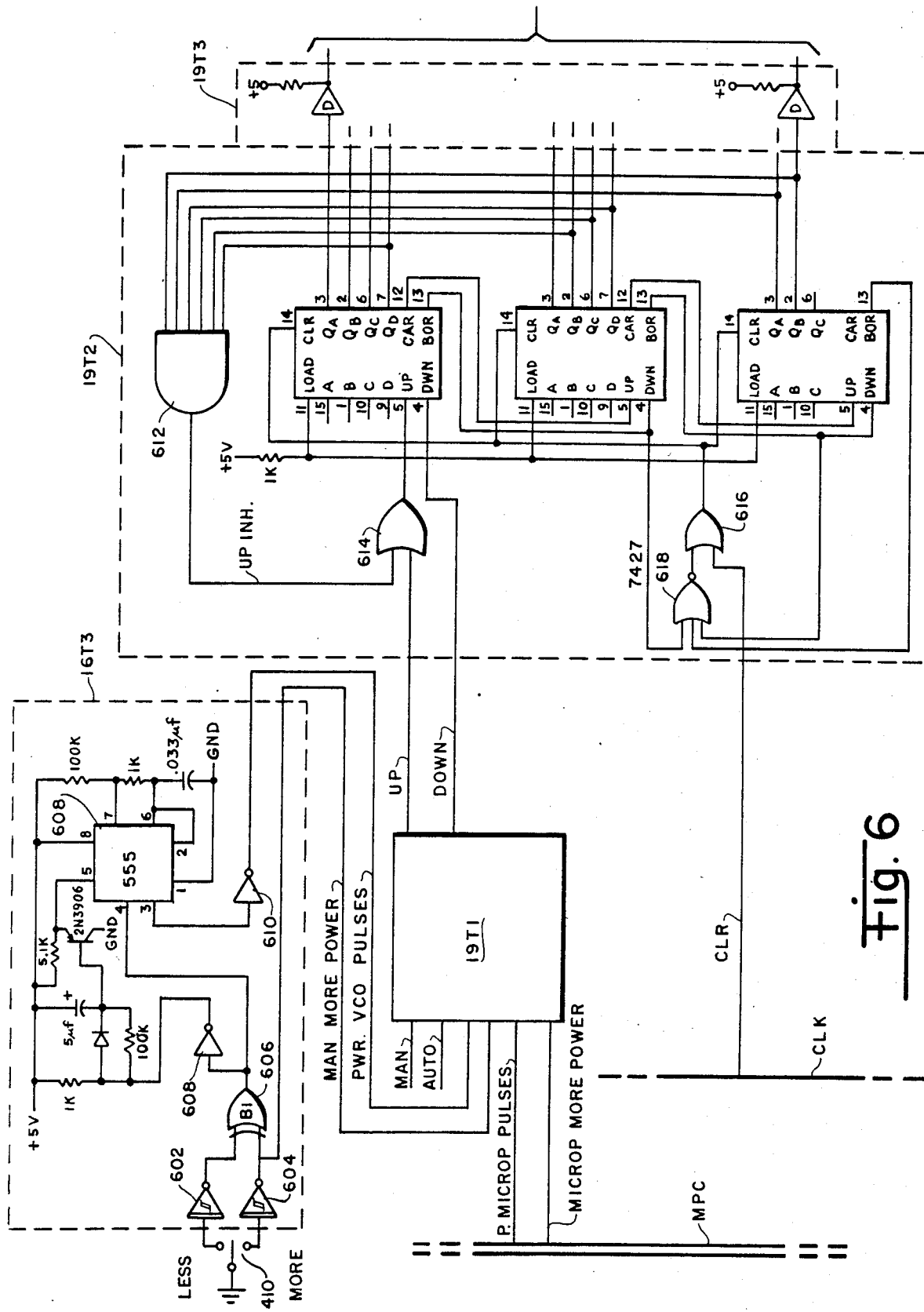
FIG. 6 is a functional block diagram an up-down counter and its input circuits for R.F. power control.

A spring-return-to center switch 410 on the control panel is used to manually control the r.f. power level via circuits shown in more detail in FIG. 6, and a digital-to-analog converter 412. The normally-off switch 410 may be operated to the upper position for less power, or to the lower position for more power. The contacts are connected to trigger circuits 602 and 604 of the type shown in FIG. 2. Thus the outputs of the triggers are both normally low, and one goes high when the switch is momentarily operated. The outputs of the two triggers are connected as inputs of an EXCLUSIVE-OR gate 606. With the switch operated in either direction, the output of the gate 606 goes high to actuate an oscillator which includes a type 555 timer and several other components as shown. The oscillator output is supplied via an inverter 610 to provide POWER VCO PULSES, with a pulse repetition rate which ramps up to 430 pulses per second, to the circuit 19T1. The output of trigger 604 is also connected via a lead for MANUAL MORE POWER to the circuit 19T1.

The circuit 19T1 is identical to circuit 19T4 shown in FIG. 1, and operates in the same manner, for manual or microprocessor control, to supply up-down signals to the counter 19T2.

The up-down counter 19T2 comprises three type 74193 devices in cascade, with a 10-bit parallel output. The six output leads for binary values 8, 32, 64, 128, 256 and 512 are used as inputs to an AND gate 612, whose ouput is connected as an input to an OR gate 614. A second input of gate 614 is the lead for the UP signal from circuit 19T1, so that the count in the up direction is inhibited when it reaches a given binary value. The counter may be reset to zero either by a signal on lead CLR from FIG. 5 via an OR gate 616 to the clear inputs of all three counter devices: or by a signal from a NOR gate 618 whose output is an input to gate 616, and whose inputs are from the borrow terminals of all three of the counter devices.

The ten output leads from the counter 19T2 are coupled via ten drivers type 7417 with output pull-up resistors, shown as unit 19T3. As shown in FIG. 4A, the outputs of the drivers 19T3 are the inputs of an digital-to-analog converter 412, whose analog output is used to contro the r.f. power level. The ten leads pC from the drivers 19T3 also are shown as forming part of the line MpF for feedback control to the microprocessor. The ten output leads pC are also connected to supply the binary digital code to a converter 14B1, whose output energizes a 4-decimal-digit display 420 on the control panel.

Rotations

The upper and lower rotation circuits shown by block diagrams in FIG. 4A are essentially the same, and therefore only the upper rotation circuits will be described. The operation using the manual switch 130 or microprocessor signals for controlling the up-down counter 19T5 via units 15T1 and 19T4 has already been described with respect to FIG. 1. The circuits 15T1 and 19T4 are shown in detail in FIG. 1. The output of the counter 19T5 via the digital-to-analog converter 19T6 and a servo amplifier 18B1 controls the upper rotation motor 320. Feedback signals from a shaft encoder 322 via a shielded cable UR are also input to the servo unit 18B1. The six output leads URC (shown as part of the set of conductors MPF) from the counter are also supplied as feedback signals to the microprocessor 300. The digital code on conductors URC is also used via a code converter 14B2 to energize a two-decimal-digit display 422 on the control panel.

Incremental encoders 322 and 326 on the rotation motors 320 and 324 respectively provide velocity feedback. The encoder output consists of sine and cosine channels which are converted with TTL logic and pulse integrators to provide a plus or minus analog negative feedback voltage to the servoamplifier.

Figure 7:
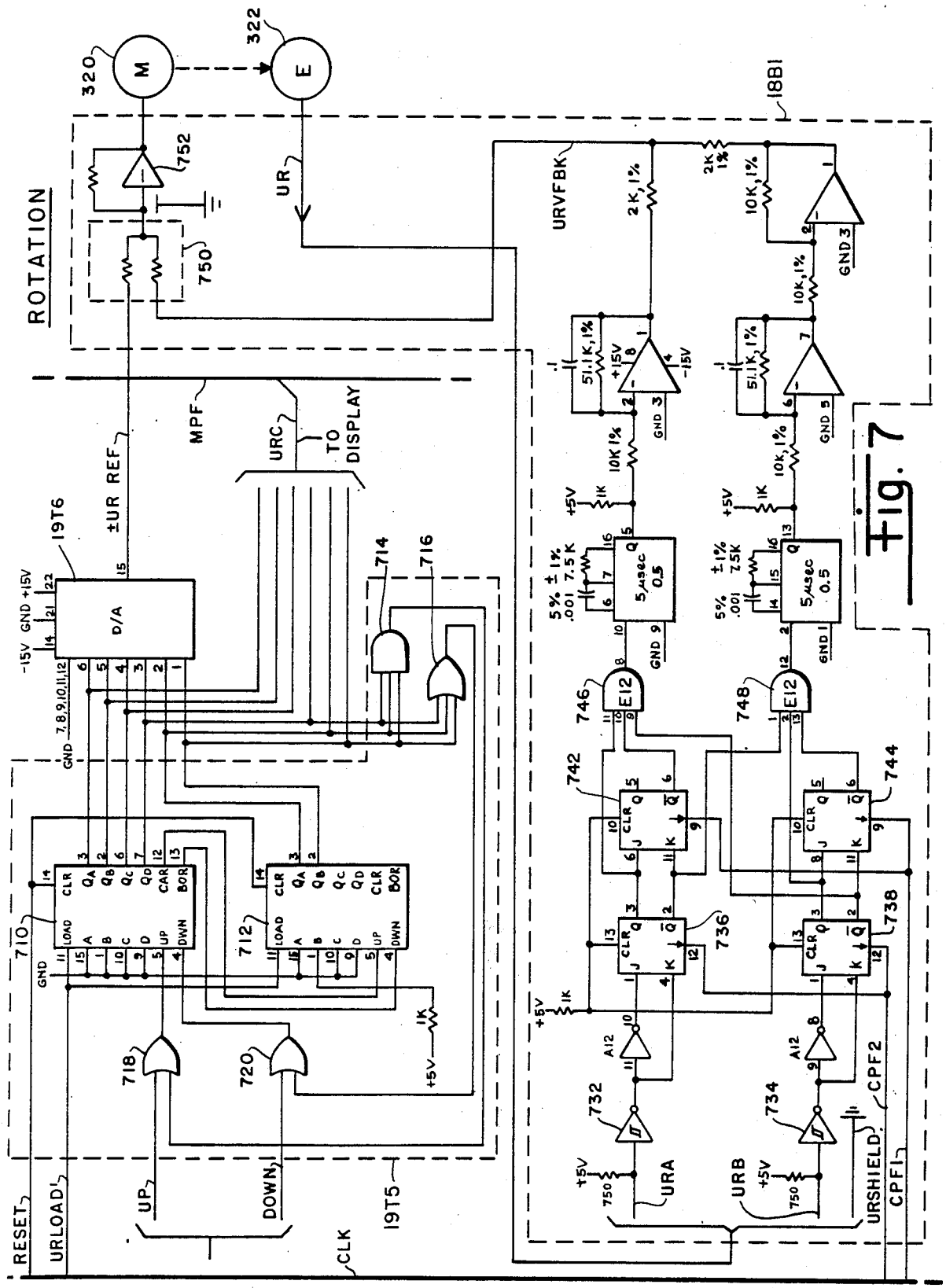
FIG. 7 is a functional block diagram an up-down counter and other circuits which together with FIG. 1 comprise circuits for control on one rotation motor.

The counter 19T55 and the velocity feedback unit 18B1 are shown in FIG. 7. The counter 19T5 comprises two type 74193 devices 710 and 712 using six outputs. FIG. 1 shows a preset MSB, which is accomplished with a signal on lead URLOAD' from FIG. 5, to the load inputs of the two counter devices, with input B of the counter device 712 high and the other parallel inputs of devices 710 and 712 low. The outputs for the three MSBs are used as input to an AND gate 714 and a NOR gate 716. The output of gate 714 is an up-inhibit signal at an OR gate 718, which couples the UP output of circuit 19T4 to the UP input of the counter. The output of gate 716 is a down inhibit signal to an OR gate 720, which couples the DOWN output of circuit 19T4 to the DOWN input of the counter.

The digital output of counter 19T5 has an LSB value of one RPM, which with six bits resolution provides a control range of ±0–31 RPM, the machine having a range of ±0–25 RPM. The converter 19T6 converts the digital number to a zero, plus or minus analog value on lead ±UR REF.

The motor 320 has a digital shaft encoder 322 which generates pulses which after conversion indicate the speed and direction of rotation of motor 320. The output of the encoder 322 appears on leads URA and URB of a shielded cable UR. The pulses from leads URA and URB are supplied via schmitt triggers 732 and 734 to type 74107 J-K flip-flops 736 and 738 respectively (inverted to the J inputs and directly to the K inputs), which are clocked by signals on lead CPF2 from FIG. 5. The outputs of these flip-flops are used as the inputs of flip-flops 742 and 744 respectively, which are clocked by signals on lead CPF1. The flip-flop outputs are coupled via AND gates 746 and 748 to type 74221 devices used as monostables to provide pulses with a fixed duration of five microseconds. The pulses are then integrated by operational amplifier circuits having type MC1458 devices. The integrated outputs which are proportional to the input pulse rate are algebraically combined on lead URVFBK to provide a plus or minus feedback signal for the servo control.

The servo includes a summer 750 having reference input (plus or minus on one lead?) from the converter 19T6, and a velocity feedback input on lead URVFBK. Analog voltages of the two inputs are converted to currents which are summed at the inverting input (voltage node) to the operational amplifier 752. The output of amplifier 752 drives the motor 320.

OFFSETS

Figure 8:
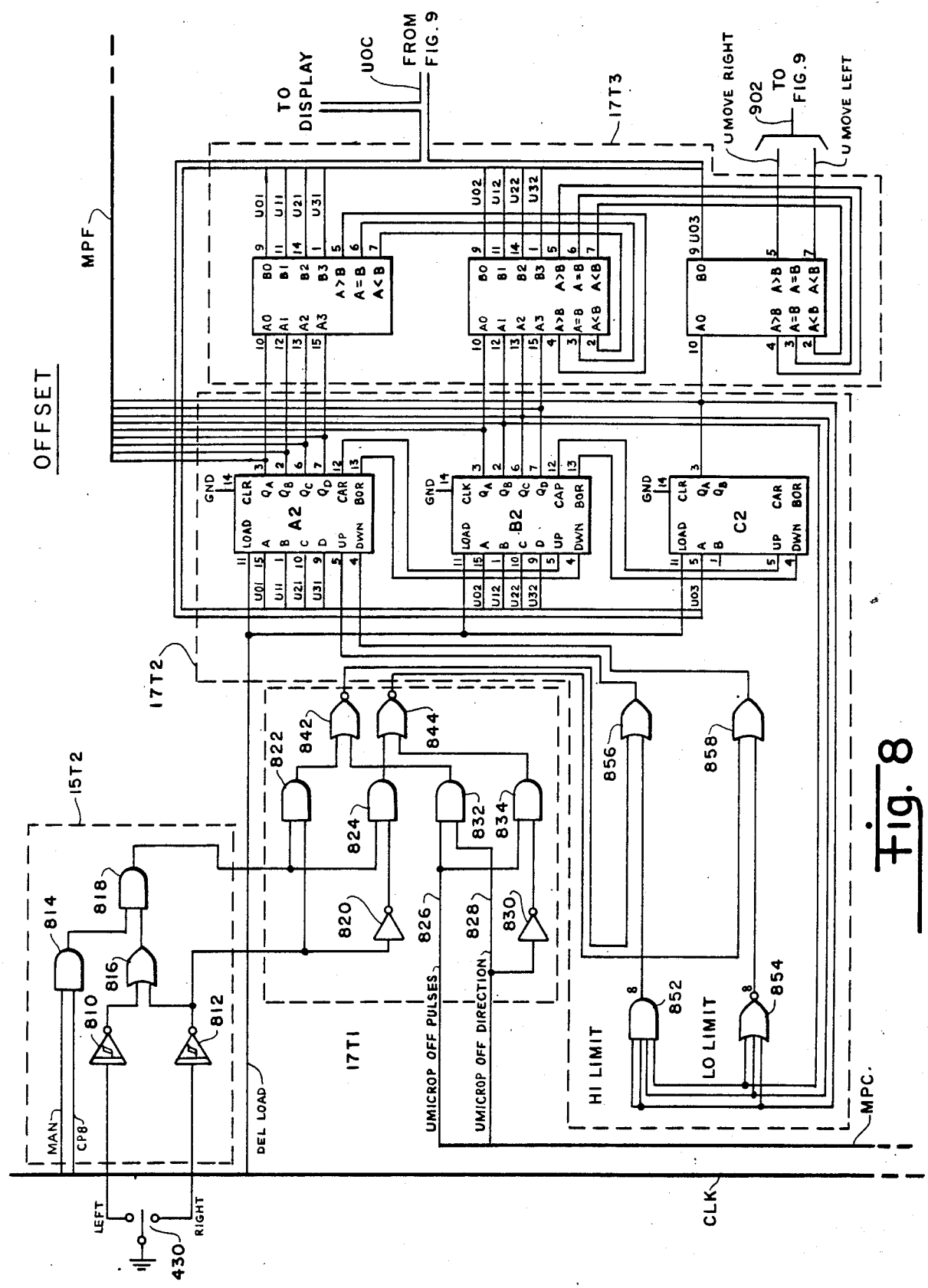
FIG. 8 is a functional block diagram an up-down counter and other circuits for control of one offset motor.

The upper and lower offset circuits shown in FIG. 4A are essentially the same. Only the upper offset circuits which are shown im more detail in FIGS. 8 and 9 will be described.

The panel switch 430 is connected to schmitt triggers (see FIG. 2.) 810 and 812 in circuit 15T2. When the manual mode is in effect the signal on lead MAN enables an AND gate 814 to pass pulses from lead CP8 to an AND gate 818. When the switch 430 is operated in either direction, the output of one of the triggers 810 or 812 via an OR gate 816 enables the gate 818 to pass the pulses to AND gates 822 and 824. The output of trigger 812 is connected directly to an input of gate 822, and via an inverter 820 to gate 824, so that when the switch is operated for the RIGHT direction gate 822 is enabled to pass the pulses via NOR gate 842 for up counting. When the switch is operated for the LEFT direction gate 824 is enabled to pass the pulses via NOR gate 844 for down counting.

In the automatic mode, when the microprocessor determines that there should be upper offset movement, pulses are supplied, on lead 826 to AND gates 832 and 834. The direction is determined by a signal on lead 828 directly to gate 832 and via an inverter 830 to gate 834. A high signal for RIGHT movement enables gate 832 to pass pulses, which via gate 842 provide for up counting. A low signal on lead 828 causes gate 834 to be enabled to pass pulses via gate 844 for down counting.

The up-down counter 17T2 comprises three cascaded type 74193 devices with nine outputs used. The three outputs for bit values 32, 64 and 256 are connected as inputs to an AND gate 852 and a NOR gate 854. An OR gate 856 has inputs from gates 842 and 852 to couple the up pulses to the counter with a high limit determined by gate 852. An OR gate 858 has inputs from gates 844 and 854 to couple the down pulses to the counter with a low limit determined by gate 854. The counter outputs are connected to the A inputs of a comparator 17T3, and are also part of the set of conductors MPF providing feedback signals to the microprocessor 300.

The comparator 17T3 comprises three type 7485 devices.

An A/D converter 332 has an analog input from a position feedback potentiometer 960 mounted on the zoner and provides a digital nine-bit offset position signal on a set of conductors UOC, which as shown in FIG. 4A, go via an code converter 16B1 to a three-decimal-diqit display 434, to the microprocessor as part of the feedback MPF, and to the B inputs of the comparator 17T3.

Figure 9:
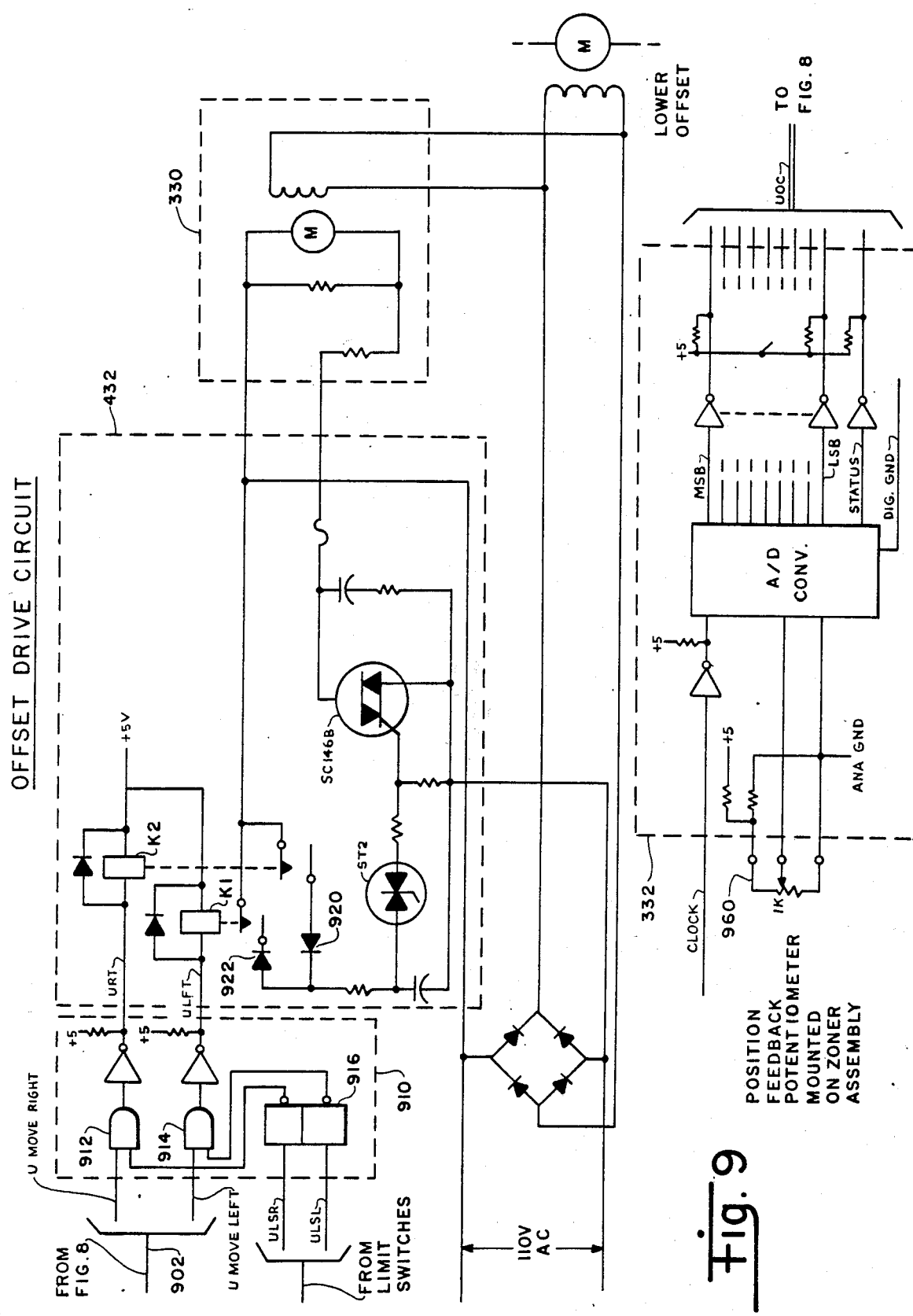
FIG. 9 is a functional block diagram a offset drive circuit and another offset control circuit.

As shown in FIG. 9. the circuit 332 includes a type ADC 550 analog-to-digital converter, with a nine-bit digital output plus a status output connected via inverters with pull-up resistors at their outputs to line UOC.

The comparator 17T3 compare the output of the up-down counter 17T2 with the output of the A/D converter 332, generating an upper move right signal if A is greater than B, or an upper move left signal if A is less that B, both outputs being low when A equals B. The pair of output conductors 902 goes to gate circuits in FIG. 9.

In FIG. 9, the two signals of line 902 are connected respectively as inputs of two AND gates 912 and 914 of a circuit 910.

Signals on leads ULSL and ULSR are from an upper limit switch left and an upper limit switch right for the upper offset. The signals on leads ULSR and ULSL are coupled via a circuit 910 which includes a light coupling device OP12253 (not shown) followed by an inverter for each signal. The outputs from circuit 910 are respective inputs of the gates 912 and 914. The outputs of gates 912 and 914 are coupled respectively via inverters having output pull-up resistors to the windings of a relays K2 and K1 of the offset servo drive circuit 432.

Power from a 110-volt a.c. source is suppled to the circuit 432, which comprises an SCR type SC246B, a trigger diode device type ST2, resistors and capacitors. The a.c. power via a bridge rectifier supplies current to the field winding of the motor 330, and also in parallel to the field winding for the lower-offset motor. Contacts of the relays K2 and K1 are in series with diodes poled in opposite directions, the other side of the contacts of the two relays being connected together to the motor armature, so that operation of relay K2 causes rectified current flow in one direction, and operation of relay K1 causes rectified current flow in the other direction.

The offset digital signals have an LSB value of 0.05 millimeters, which with 8-bit resoluton provides a control range of ±0–6.35 millimeters, there being a machine range of ±0–4 MM.

TRAVERSES

The upper and lower traverse circuits shown in FIGS. 4B and 4C are essentially the same, except for sync circuits, and only the upper traverse circuits will be described. The controls on the panel include separate momentary-operate switches 440 and 442 for up and down direction selection, with associated indicator lamps 444 and 446. Note that one of the lamps will remain on to indicate the direction of travel currently in effect, even if the direction has been selected by the microprocessor. A four-decimal-digit display 450 indicates the digital code value for the rate of travel. The controls also include an encoder device 448, whose outrput on two leads PUTA and PUTB of a shielded line goes to a pulse feedback circuit 18T3. The output of circuit 18T3 is connected via a line FP3 to the rate select circuit 19B3.

Figure 10:
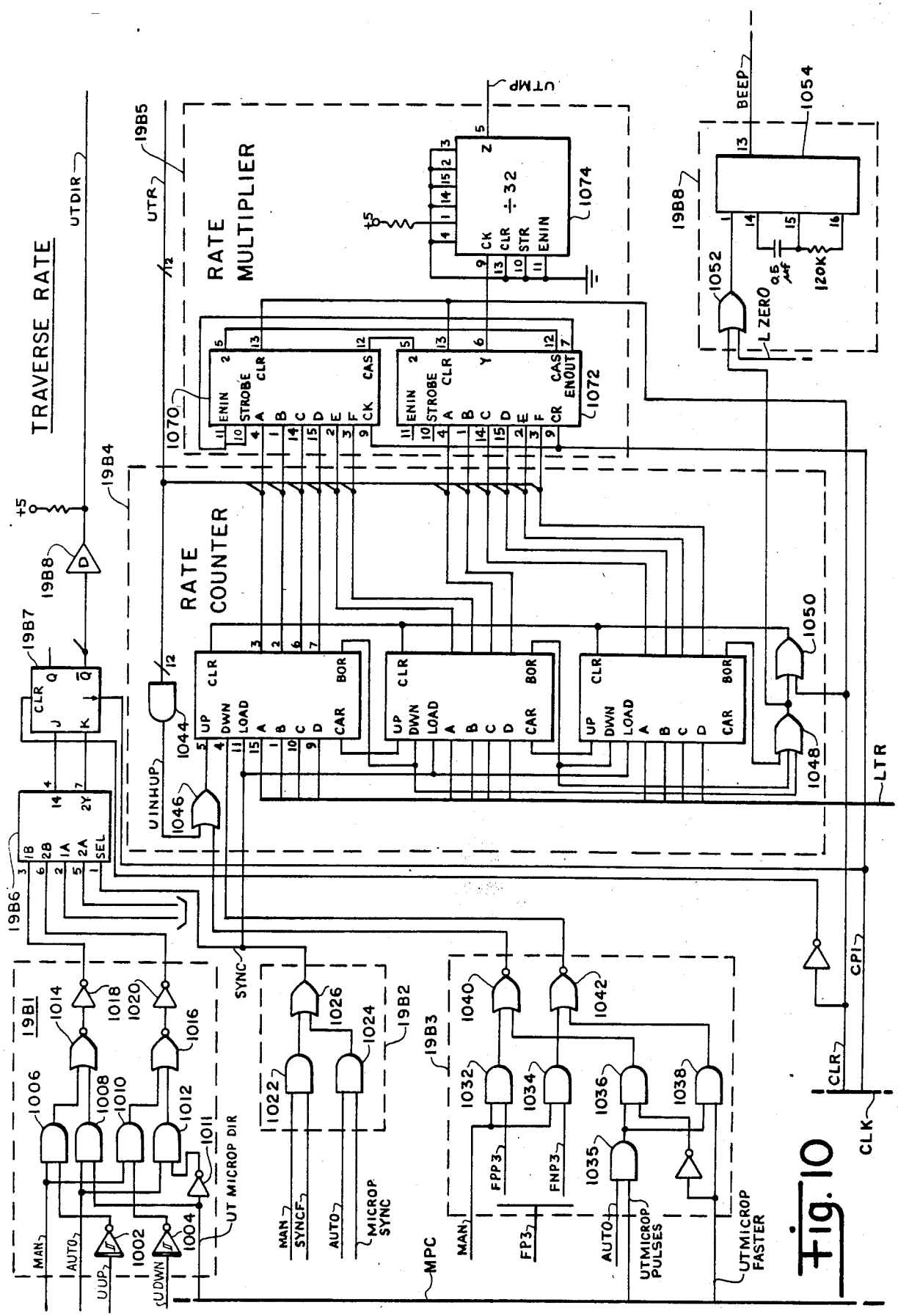
FIGS. 10, 11 and 12 are tunotional block diagrams of up-down counters and other clrcuits for control of one traverse motor.

The upper traverse direction select circuit 19B1 (FIG. 10) has input triggers 1002 and 1004 (as shown in FIG. 2) for the signals from the switches 440 and 442 respectively. When manual control is in effect, the signal on lead MAN enables AND gates 1006 and 1010. If the output of trigger 1002 is high, the signal is coupled via gate 1006, NOR gate 1014, and inverter 1018 to the 1B input of a multiplexer device 19B6, and from there to the J input of a flip-flop 19B7. If the output of trigger 1004 is high, the signal is coupled via gate 1010, NOR gate 1016, and inverter 1020 to the 2B input of multiplexer device 19B6, and from there to the K input of a flip-flop 19B7. The flip-flop is clocked by pulses on lead CP1.

If automatic operation is in effect, AND gates 1008 and 1012 are enabled by the signal on lead AUTO. The upper traverse microprocessor direction signal lead is connected directly to gate 1008, and via an inverter 1011 to gate 1012. The outputs of gates 1008 and 1012 are connected to inputs of NOR gates 1014 and 1016 respectively, to supply an up-select or down-select signal to the flip-flop 19B7.

As shown in FIG. 4B, the outputs of the flip-flop 19B7 are coupled via inverters to the panel lamps 444 and 446 (light emitting diaodes). Note that the output of the lower traverse direction select circuit 19B11 is connected directly to the flip-flop 19B17. and that the output of flip-flop 19B7 is connected to the A inputs of the multiplexer 19B6. This is for sync operation. The Q' output of the flip-flop 19B6 is coupled via a type 7417 driver 19B8 to a lead UTDIR'.

The sync traverses controls on the panel (FIG. 4B) include separated momentary operate switches 454 and 456 for on and off selection, with associated indicator lamps 458 and 460. The switches are coupled via triggers 460 and 462 (FIG. 2) to the J and K inputs of a flip-flop 466 in circuit 16T4. The flip-flop is clocked by pulses on lead CP2. The Q and Q' are coupled via inverters to the indicator lamps 458 and 460. The Q output is supplied via lead SYNCF to the sync select circuit 19B2 FIG. 10.

The SYNCF lead goes to an AND gate 1022, which also has an input on lead MAN and an output coupled via an OR gate 1026 to lead SYNC, so that when manual control is in effect and the signal SYNCF is high, the signal on lead SYNC is also high. An AND gate 1024 has inputs on leads AUTO and MICRROP SYNC, and an output to the OR gate 1026, so that when automatic operation is in effect, the microprocessor 300 can make the signal on lead SYNC high. The lead SYNC is connected to the select input of the multiplexer 19B6 (type 74157), and to the load input of a rate counter 19B4. Note that the lamps 458 and 460 indicate the latest manual selection.

When the signal on lead SYNC is low, the upper and lower traverse controls operate independently. The upper traverse direction select circuit 19B1 controls the state of flip-flop 19B7, and the lower traverse direction select circuit controls the state of flip-flop 19B7. Also the rate counters 19B4 and 19B14 are controlled independently. When the signal on lead SYNC is high, the lower traverse direction select circuit 19B11 controls the state of both flip-flops 19B7 and 19B17, so that they have the same state. The 12-bit output of the lower traverse rate counter is connected to parallel inputs of the upper traverse rate counter 19B4. When the signal on lead SYNC is high, load is enabled in the upper traverse rate counter 19B4 so that it follows the count in the lower traverse rate counter 19B14. Thus when synchronization is in effect, the upper traverse and lower traverse operate in the same direction at the same rate.

Figure 12:
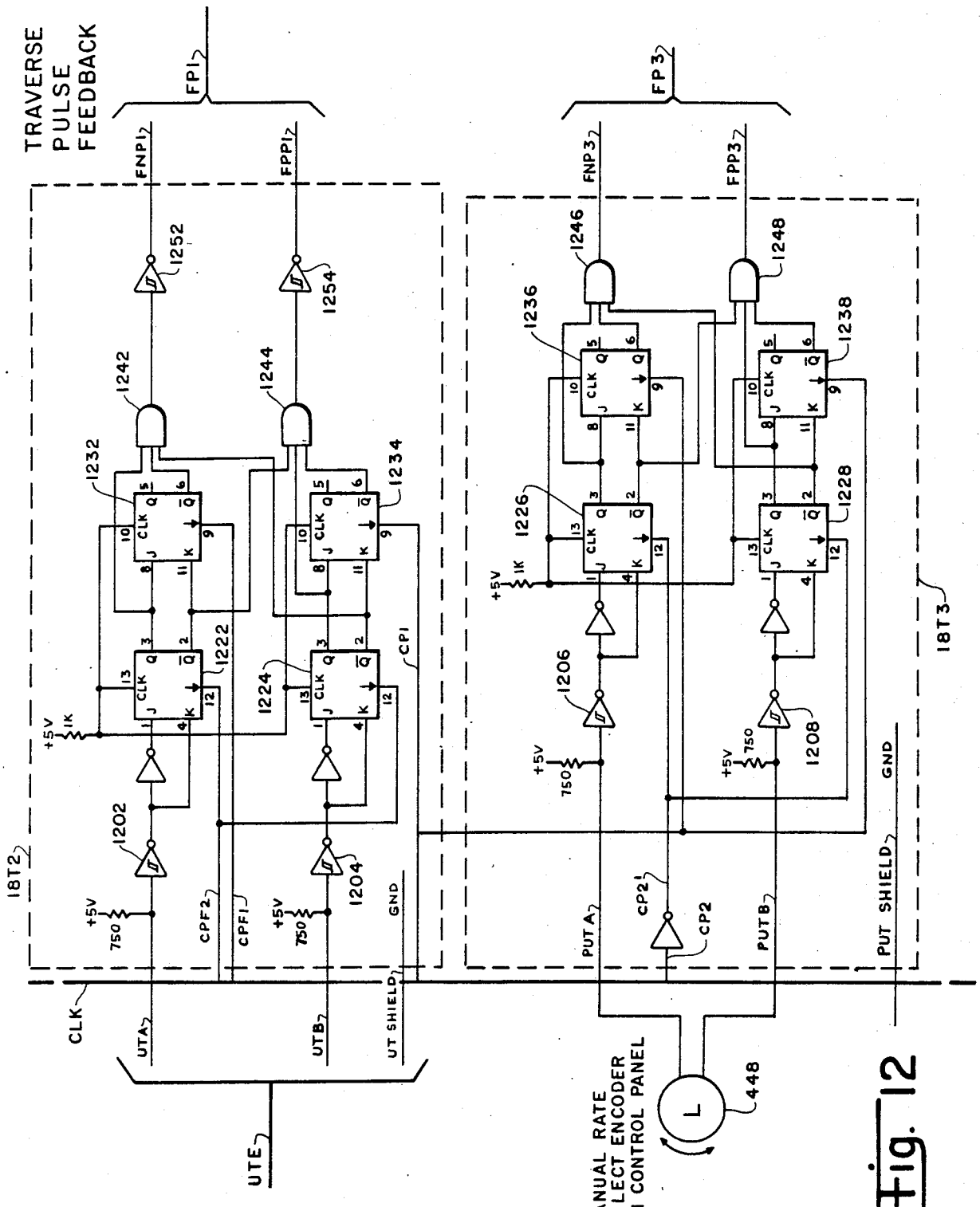

An upper traverse rate select circuit 19B3, comprises AND gates 1032, 1034 1036 and 1038, with outputs of gates coupled via a NOR gate 1040 to supply pulses for counting up to a faster rate, and outputs of gates 1036 and 1038 coupled via a NOR gate 1042 to provide pulses for counting down to a slower rate. For manual control, the lead MAN is connected to gates 1032 and 1034 which have respective pulse inputs on leads FPP3 and FNP3 of conductor pair FP3 from a pulse feedback circuit 18T2 (FIGS. 4C and 12). For automatic control, an AND gate 1035 has an input of lead AUTO and an input from the microprocessor 300 on lead UT MICROP PULSES. The output of gate 1035 is to gates 1036 and 1038. The direction of counting up or down is controlled by a signal on lead UT MICROP FASTER, which is connected directly to gate 1038, and via an inverter to gate 1036.

The rate counter 19B4 is an up-down counter comprising three type 74193 devices in cascade, with all 12 outputs used. The up counting is provided by the output from gate 1040 via an OR gate 1046 to the up input of the first counting device, and for down counting the output of gate 1042 is connected directly to the down input of the first device. For up inhibit a set of gates represented as an AND gate 1044 has inputs for all 12 bits of the counter output. The output of gate 1044 is an input of gate 1046. An OR gate 1048 has inputs from the borrow terminals of the three counter devices. An OR gate 1050 has one input from gate 1048 and another input on lead CLR from FIG. 5. The output of gate 1050 is connected to the clear terminal of the three counting devices.

The output of the counter goes to a rate multiplier 19B5, to the microprocessor 300 as part of the feedback MPF, and via a code convert circuit 16B2 to the four-decimal-digit display 450.

The output of gate 1048 is also connected to a NOR gate 1052 of a beep circuit 19B8. Gate 1052 has an output to terminal 1 of a type 74221 device 1054. This circuit provides a BEEP signal to energize an audible device, indicating that the rate counter has counted down to zero, meaning that the upper traverse has stopped.

The rate multiplier 19B5 comprises two type 7497 devices 1070 and 1072 in cascade to provide for 12 inputs from the outputs of the counter 19B4. A third type 7497 device 1074 is in tandem with output for upper transverse move pulses on lead UTMP. The combination of devices 1070 and 1072 has a variable multipler (less than unity) for clock pulses supplied on lead CP1, while the device 1074 provides an additional divide by 32, its B input being high, and inputs ACDEF low.

The operator may control the traverse rate by controlling the value in the rate counter 19B4, using the panel mounted encoder 448 (FIGS. 4C and 12), via the pulse feedback circuit 18T3 and the rate select circuit 19B3.

Figure 11:
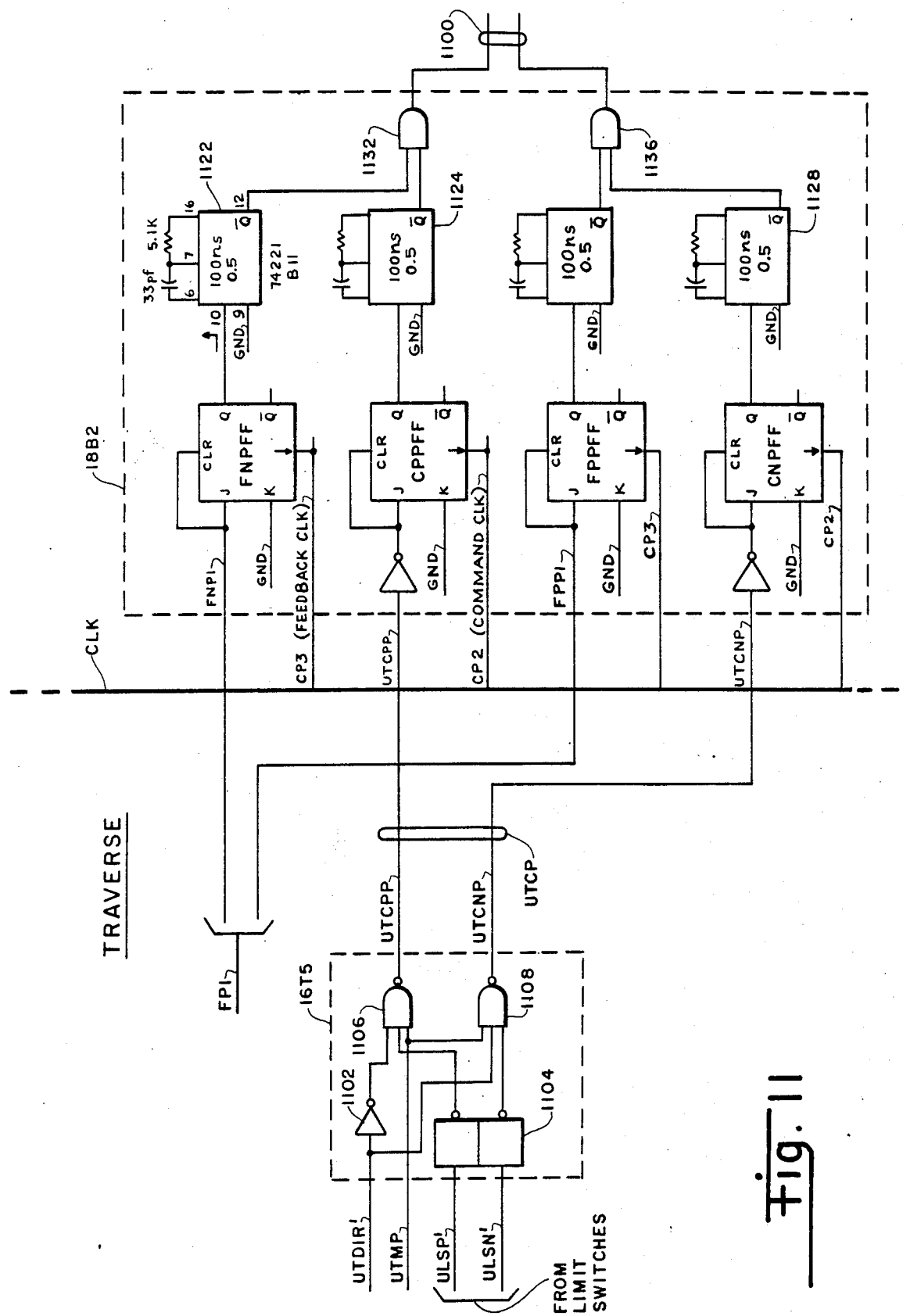

The circuit 16T5 of FIG. 4B is shown in FIG. 11. Its output comprises two leads UTCPP and UTCNP, shown as a pair UTCP in FIGS. 4B and 4C. It repeats the pulses from the rate multiplier on lead UTMP either as command pulses for positive or up movement via a NAND gate 1106 to lead UTCPP, or as comand pulses for negative or down movement via a NAND gate 1108 to lead UTCNP, depending on the direction indicated by the logic level on lead UTDIR'. The lead UTDIR' is connected directly as an input to gate 1108, and via an inverter 1102 to gate 1106. Leads ULSP' and ULSN', which are coupled via a circuit 1104 to inputs of gates 1106 and 1108 respectively, come from limit switches which inhibit move pulses at both ends of travel. The circuit 1102 includes light coupling devices type OP12253 (not shown).

The pulse direction control circuit 18B2 in FIG. 4C is shown in FIG. 11. It has the pair of input leads UTCP from circuit 16T5, and also a pair FP1 (FNP1 and FPP1) from a pulse feedback circuit 18T2. It comprises a FNPFF having input from lead FNP1 to its J and CLR inputs, a flip-flop CPPFF having input from lead UTCPP via an inverter to its J and CLR inputs, a flip-flop FPPFF having input from lead FPP1 to its J and CLR inputs, and a flip-flop CNPFF having input from lead UTCNP via an inverter to its J and CLR inputs. Flip-flops FNPFF and FPPFF are clocked by pulses on lead CP3 (feedback clock), while flip-flops CPPFF and CNPFF are clocked by pulses on lead CP2 (command clock). The Q outputs of the four flip-flops are connected respectively to four type 74221 devices 1122, 1124, 1126 and 1128 for positive edge triggering. The latter devices are used as monostables with external resistance and capacitance for generating 100-nanosecond output pulses. The Q' outputs of devices 1122 and 1124 are inputs of an AND gate 1132, and the Q' outputs of devices 1126 and 1128 are inputs of an AND gate 1136. The pair of outputs of the two AND gates, designated 1100, are used as the up and down inputs of an up-down counter 18B4 in FIG. 4C.

Circuit 18B2 gates the traverse move command pulses and motor encoder generated feedback pulses so that they are available at different times for use by the up-down counter 18B4 in FIG. 4C. Temporal pulse separation is accomplished by a digital derived phase difference in the clock signals CP2 and CP3 as shown in FIG. 5A. Input pulse rates to flip-flops FNPFF, CPPFF, FPPFF, and CNPFFF (IC type 74107) are always much lower that the rates of the clock pulses on leads CP2 and CP3. Therefore all input pulses are converted to 100-ns output pulses with command and feedback pulses occuring at different times. The AND gates 1132 and 1136 are used for an OR function so that when a monostable is pulsed the Q' goes low causing the output of gate 1132 or gate 1136 to go low for the pulse duration. The up-down counter 18B4 comprises four type 74193 devices (not shown) in cascade. The four parallel inputs of each of the first three devices and the first input of the last device are connected via a pull-up resistor to +5 volts, with the other three parallel inputs of the last device grounded. A signal on lead RESET' from FIG. 5 is used as a load input to all four devices, making the first 15 (least significant) bits high and the last three (most significant) bits low. Twelve bits 3–14 (weighted 1-2-. . . -2048) from the counter output are connected to a type DAC9356 digital-to-analog converter 18B5, whose analog output is designated UTREF.

The upper traverse pulse feedback circuit 18T2 in FIG. 4C is shown in FIG. 12. The shielded line UTE from the encoder 342 in FIG. 4C is shown in FIG. 12, where direction decoding circuitry provides positive direction and negative direction pulses FPP1 and FNP1 respectively. The control panel encoder 448 is also shown in FIG. 12 with a shielded line for leads PUTA and PUTB to the circuit 18T3 for direction decoding.

The encoder 342 (FIG. 4C) is an optical incremental encoder mounted on the U12M4 motor shaft. Sine and cosine output leads UTA and UTB respectively of line UTE go to circuit 18T2, where negative (FNP1) and positive (FPP1) directioin pulses are generated. In FIG. 11, circuit 18B2 gates these pulses in the same counters where command and feedback are subtracted. The difference count is converted to analog which is input to the traverse servo amplifier.

Each of the four shielded encoder leads UTA, UTB, PUTA and PUTB has a pull-up resistor at the inputs of respective type 7414 schmitt triggers 1202, 1204, 1206 and 1208. The output of these four triggers are coupled respectively to the inputs of four flip-flops 1222, 1224, 1226 and 1228, directly to the K inputs and via inverters to the J inputs. The outputs of these four flip-flops are connected in turn to the respective inputs of four flip-flops 1232, 1234, 1236 1238, with Q output to J input and Q' output to K input. Flip-flops 1222 and 1224 are clocked by pulses on lead CPF2 from FIG. 5, flip-flop 1232 is clocked by pulses on lead CPF1, fliP-flops 1234, 1236 and 1238 are clocked by pulses on lead CP1, and flip-flops 1226 and 1238 are clocked by pulses on lead CP2'. The clear inputs of all eight flip-flops are connected via a pull-up resistor to +5 volts. The Q output of flip-flop 1222, the Q' output of flip-flop 1232 and the Q' output of flip-flop 1224 are the inputs of an AND gate 1242, whose output is via schmitt trigger inverter 1252 to lead FNP1. The Q' output of flip-flop 1222, the Q output of flip-flop 1224 and the Q' output of flip-flop 1234 are the inputs of an AND gate 1244, whose output is via a schmitt trigger inverter 1254 to lead FPP1. These two output leads comprise the line FP1 to the pulse direction circuit 18B2 in FIGS. 4C and 11. The Q output of flip-flop 1226, the Q' output of flip-flop 1236 and the Q' output of flip-flop 1228 are the inputs of an AND gate 1246, whose output is to lead FNP3. The Q' output of flip-flop 1226, the Q output of flip-flop 1228 and the Q' output of flip-flop 1238 are the inputs of an AND gate 1248, whose output is to lead FPP3. These two output leads comprise the line FP3 to to rate select circuit 19B3 in FIGS. 4B and 10.

The integrator 18B3 in FIG. 4C is like that shown in FIG. 7 which produces the signal URVFBK. The integrator 18B3 produces the signal on lead UTVFFDBK. The leads UTREF from converter 18B5 and UTVFFDBK from the integrator 18B3 are inputs to a summer 480, whose output via an amplifier 482 drives the upper transport motor 340. The structure and operation of summer 480 and amplifier 482 are like that of devices 750 and 752 in FIG. 7.

With a LSB value of 0.1 millimeter per minute, and a resolution of 12 bits, the control range is +0–409 millimeters per minute, which is also the machine range.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. Control means including a counter having at least one serial input, for a system having a utilization device in which a digital value registered in the counter determines a given parameter relating to operation of the utilization device, and including first and second alternative sources which supply pulses for changing the digital value in the counter; wherein said control means further includes;
    source-select switching means having first and second states and means for changing the state, the first state being for using said first source and the second state being for using the second source;
    selection means having first gating means with inputs from the first source and from the source-select switching means enabled with the source select switching means in the first state to pass pulses from the first source, and second gating means with inputs from the second source and from the source-select switching means enabled with the source select switching means in the second state to pass pulses from the second source, and output gating means coupled between the first and the second gating means and said serial input of the counter to pass any pulses to the counter from whichever of the first and second gating means is enabled, with no extra pulse being passed to the counter in response to the switching means changing state;

wherein said counter is an up-down counter having an up input and a down input which are serial inputs for counting up and down respectively, and said first and second sources also each supply a direction indiciation which has two possible values for up and down counting respectively;

wherein said selection means has two outputs coupled to said up input and said down inputs respectively;

said first gating means has two outputs for up and down counting respectively and is arranged so that when enabled by the first state of the source-select switching means any pulses from the first source are passed to its up or down output depending on the value of the direction indication from that source;

said second gating means has two outputs for up and down counting respectively and is arranged so that when enabled by the second state of the source-select switching means any pulses from the second source are passed to its up or down output depending on the value of the direction indication from that source;

said output gating means has two outputs coupled respectively to said up and down inputs of the counter, and is arranged to pass any pulses from the outputs for up counting from either the first or the second gating means to its output coupled to the up input of the counter, and to pass any pulses from the outputs for down counting from either the first or the second gating means to its output coupled to the down input of the counter;

wherein said first source is a manual-controlled source having a manual switch device which is normally off and has two on states, either one of which may be manually selected, with means for causing pulses to be supplied to said first gating means only in response to the manual switch device being in either on state, the value of the direction indication from the first source depends on which of its on states is currently selected, and display means coupled to the output of the counter for displaying the digital value of the count;

wherein said second source is a microprocessor, and the output of the counter is supplied to the microprocessor as feedback information;

wherein said manual controlled source includes two panels which has duplicate sets of momemtary operate manual switches with corresponding manual switches having output contacts connected together;

wherein said source-select switching means includes a bistable device which may be selectively set to said first or second state by manual switches on either panel.

2. Control means according to claim 1, wherein said counter is a binary counter with one bit which is a most significant bit, means for presetting the most significant bit high as a sign bit, a digital-to-analog converter coupled between the output of the counter and the utilization device for converting the output of the counter to a a reference signal having a positive value in response to the sign bit being high and a negative value in response to the sign bit being low.

3. Control means according to claim 2, wherein said utilization device is a mechanical device having a shaft and a motor coupled to drive the shaft, an encoder which indicates the current value of said parameter for the shaft, the output of the encoder being a train of digital pulses which indicates the value and the sign of said parameter, means for detecting the train of pulses from the encoder and integrating them to provide feedback analog signal, servo means having inputs for said reference signal and for said feedback analog signal, and an output from the servo means to control the motor to adjust the current value of the parameter to that commanded by the value in said counter.

4. Control means according to claim 3, wherein said parameter is the rate of rotation of said shaft. the sign indicating the direction of rotation.

5. Control means according to claim 1, wherein said first source is a manual-controlled source having a manual switch device which is normally off and has two on states, either one of which may be manually selected, with means for causing pulses to be supplied to said first gating means only in response to the manual switch device being in either on state, the value of the direction indication from the first source depends on which of its on states is currently selected;

wherein said second source is a microprocessor;

wherein said utilization device is a mechanical device having a motor for moving the device, an encoder on the device for indicating its position by a digital code display means coupled to the output of the encoder for displaying the value of the digital code, the output of the encoder being also suppled to the microprocessor as feedback information;

comparison means having a first digital parallel input coupled to the output of the counter, a second digital parallel input coupled to the output of the encoder and two outputs, with a signal on one output indicating when the value of the digital code at the first input is greater, and with a signal on the other output indicating when the value of the digital code at the second input is greater, means coupled between the outputs of the comparison means and the motor to drive the motor in a direction to change the digital code from the encoder toward that in the counter.

6. Control means according to claim 1, wherein said utilization device is a mechanical device having a motor for moving the device, an encoder on the device having two output lines providing digital pulse trains indicating the position. rate, and direction of movement in one coordinate for the device;

pulse feedback means comprising two sets of J-K flip-flops having pulse inputs from a clock and respectively from the two output lines of the encoder, and with gate means coupling outputs of the sets of flip-flops respectively to first and second pulse feedback lines;

said first source being said second pulse feedback line, which has two leads. the direction indication being given by pulses being on one or the other of the leads:

said seoond source being being a microprocessor;

wherein said counter is a rate counter which stores a digital code for a commanded rate of movement in said one coordinate, display means coupled to the output of the rate counter for displaying the value of the digital code, the output of the rate counter being also coupled to the microprocessor for feedback information;

a rate multiplier having parallel inputs coupled to the rate counter output, a clock input receiving serial pulses at a fixed rate, and an output on which there is supplied a train of pulses at a rate which depends on the value of the digital code represented by the output of the rate counter.

7. Control means according to claim 1, wherein said utilization device has a plurality of parameters controlled by the control means, with a separate selection means and up-down counter for each parameter.

8. Control means including a counter having at least one serial input, for a system having a counter determines a given parameter relating to operation of the utilization device, and including first and second alternative sources which supply pulses for changing the digital value in the counter; wherein said control means further includes;

source-select switching means having first and second states and means for changing the state, the first state being for using said first source and the second state being for using the second source;

selection means having first gating means with inputs from the first source and from the source-select switching means enabled with the source select switching means in the first state to pass pulses from the first source, and second gating means with inputs from the second source and from the source-select switching means enabled with the source select switching means in the second state to pass pulses from the second source, and output gating means coupled between the first and the second gating means and said serial input of the counter to pass any pulses to the counter from whichever of the first and second gating means is enabled, with no extra pulse being passed to the counter in response to the switching means changing state;

wherein said counter is an up-down counter having an up input and a down input which are serial inputs for counting up and down respectively, and said first and second sources also each supply a direction indication which has two possible values for up and down counting respectively;

wherein said selection means has two outputs coupled to said up input and said down inputs respectively;

said first gating means has two outputs for up and down counting respectively and is arranged so that when enabled by the first state of the source-select switching means any pulses from the first source are passed to its up or down output depending on the value of the direction indication from that source;

said second gating means has two outputs for up and down counting respectively and is arranged so that when enabled by the second state of the source-select switching means any pulses from the second source are passed to its up or down output depending on the value of the direction indication from that source:

said output gating means has two outputs coupled respectively to said up and down inputs of the counter, and is arranged to pass any pulses from the outputs for up counting from either the first or the second gating means to its output coupled to the up input of the counter, and to pass any pulses from the outputs for down counting from either the first or the second gating means to its output coupled to the down input of the counter;

wherein said utilization device is a mechanical device having a motor for moving the device, an encoder on the device having two output lines providing digital pulse trains indicating the position, rate, and direction of movement in one coordinate for the device;

pulse feedback means comprising two sets of J-K flip-flops havinq pulse inputs from a clock and respectively from the two output lines of the encoder, and with gate means coupling outputs of the sets of flip-flops respectively to first and second pulse feedback lines;

said first source being said second pulse feedback line, which has two leads, the direction indication being given by pulses being on one or the other of the leads;

said second source being a microprocessor;

wherein said counter is a rate counter which stores a digital code for a commanded rate of movement in said one coordinate, display means coupled to the output of the rate counter for displaying the value of the digital code, the output of the rate counter being also coupled to the microprocessor for feedback information;

a rate multiplier having parallel inputs coupled to the rate counter output, a clock input receiving serial pulses at a fixed rate, and an output on which there is supplied a train of pulses at a rate which depends on the value of the digital code represented by the output of the rate counter;

further including a direction-select circuit having inputs from said source-select switching means which indicates either manual or automatic control, with inputs for direction signals either from said second source or from a manual source, with gate means for selecting the direction signal from the manual or second source as determined by the source-select switching means indicating manual or automatic control respectively, and a direction flip-flop coupled to the gates to be set in accordance with the state of the direction signal selected by the last said gate means;

rate-direction gate means (16T5) for combining the outputs of the direction flip-flop and the rate multiplier to couple the pulses from the rate multiplier to one of two outputs depending on the state of the direction flip-flop;

a pulse direction control circuit comprising two feedback flip-flops having inputs from said first pulse feedback line, and two command flip-flops having inputs from said rate-direction gate means, a source of feedback clock pulses and command clock pulses which are at the same rate but occuring alternately, the feedback clock pulses being supplied to clock inputs of the two feedback flip-flops, and the command clock pulses being supplied to the two command flip-flops, the outputs of the flip-flops being coupled to monostable devices to provide fixed equal pulse lengths, the output of one feedback flip-flop and one command flip-flop via said monostable devices being combined in one gate, and the outputs of the other feedback flip-flop and the other command flip-flop via said monostable devices being combined in another gate;

a second up-down counter having having up and down inputs from said gates of the pulse direction control circuit, a digital-to-analog converter having digital inputs from the second up-down counter and an analog output which is reference signal;

an integrator having inputs from said first pulse feedback line for integrating the pulses to provide an analog feedback signal, servo means having inputs of said reference signal and said analog feedback signal which compares its input signals, the servo means having an output coupled to drive said motor and adjust its rate and direction to the commanded value.

9. Control means according to claim 8, wherein said utilization device includes a second motor having associated therewith its own encoder, pulse feedback means, rate counter, rate multiplier, direction-select circuit, rate-direction gate means, pulse direction control circuit, second up-down counter with a digital-to-analog converter, integrator and servo means;

synchronization means having a sync bistable device and means for setting and resetting it either from the manual source or from the microprocessor;

a multiplexer having a first set of inputs from the direction-select circuit for the first said motor, a second set of inputs from the direction-select circuit for said second motor, outputs to the direction flip-flop for the first motor, and a select input from the sync bistable device so that with the sync bistable device in its reset state the first set of inputs is enabled to couple the output of the directions-select circuit for the first motor to its own direction flip-flop, and alternatively with sync bistable device in its set state, the output of the direction-select circuit for the second motor is coupled directly to its own direction flip-flop, and also via the multiplexer to the direction flip-flop for the first motor, whereby the two motors are commanded to move in the same direction;

the rate counter for the first motor having parallel inputs from the output of the rate counter for the second motor, the sync bistable device having a connection from its output to load input of the rate counter for the first motor, so that when the sync flip-flop is in its set state the output of the rate counter for the second motor is loaded into the rate counter for the first motor, whereby the two motors are commanded to move at the same rate.

* * * * *

UNITED STATES PATENT AND TRADEMARK OFFICE
CERTIFICATE OF CORRECTION

PATENT NO. : 4,669,042

DATED : May 26, 1987

INVENTOR(S) : Alan R. Henderson and John P. Sheppard

It is certified that error appears in the above-identified patent and that said Letters Patent is hereby corrected as shown below:

At column 1, line 56 "counte" should read --counter--.

At column 7, line 22 "controI" should read --control--.

At column 8, line 50 after "direction", delete "bit".

At column 9, line 54 "0.325" should read --0.2325--.

At column 17, line 14 "inptus" should read --inputs--.

At column 18, line 6 "fliP-flops" should read --flip-flops--.

At column 18, line 13 --a-- should follow "via".

Claim 1, line 32, "indiciation" should read --indication--.

Claim 5, line 14, a comma (,) should follow "code"--.

Claim 6, line 17, "seoond" should read --second--.

UNITED STATES PATENT AND TRADEMARK OFFICE
CERTIFICATE OF CORRECTION

PATENT NO. : 4,669,042
DATED : May 26, 1987
INVENTOR(S) : Alan R. Henderson and John P. Sheppard It is certified that error appears in the above-identified patent and that said Letters Patent is hereby corrected as shown below:

Claim 8, line 2, after "having a" there should be inserted --utilization device in which a digital value registered in the --.

Signed and Sealed this

Fifth Day of January, 1988

Attest:

DONALD J. QUIGG

Attesting Officer

Commissioner of Patents and Trademarks